United States Patent
Tsujimoto

(10) Patent No.: US 9,313,348 B2
(45) Date of Patent: Apr. 12, 2016

(54) IMAGE PROCESSING DEVICE AND IMAGE PROCESSING SYSTEM

(71) Applicant: Sharp Kabushiki Kaisha, Osaka-shi, Osaka (JP)

(72) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/400,858

(22) PCT Filed: May 21, 2013

(86) PCT No.: PCT/JP2013/064015
§ 371 (c)(1),
(2) Date: Nov. 13, 2014

(87) PCT Pub. No.: WO2013/176105
PCT Pub. Date: Nov. 28, 2013

(65) Prior Publication Data
US 2015/0146242 A1 May 28, 2015

(30) Foreign Application Priority Data
May 25, 2012 (JP) ................................. 2012-119855

(51) Int. Cl.
*G06F 15/00* (2006.01)
*H04N 1/00* (2006.01)
(Continued)

(52) U.S. Cl.
CPC .......... *H04N 1/00506* (2013.01); *G06F 3/1204* (2013.01); *G06F 3/1236* (2013.01); *G06F 3/1253* (2013.01); *G06F 3/1292* (2013.01); *H04N 1/00233* (2013.01); *H04N 1/00307* (2013.01); *H04N 1/00395* (2013.01); *H04N 1/00408* (2013.01); *H04N 1/00413* (2013.01); *H04N 1/00474* (2013.01); *H04N 1/00482* (2013.01); *H04N 1/32106* (2013.01); *H04N 2201/0039* (2013.01); *H04N 2201/0048* (2013.01); *H04N 2201/0055* (2013.01);
(Continued)

(58) Field of Classification Search
CPC .............................................. H04N 2201/0048
See application file for complete search history.

(56) References Cited

U.S. PATENT DOCUMENTS

| | | | |
|---|---|---|---|
| 5,440,371 | A | 8/1995 | Okatani |
| 2004/0258429 | A1 | 12/2004 | Moroi |

(Continued)

FOREIGN PATENT DOCUMENTS

| | | |
|---|---|---|
| JP | 05-273823 A | 10/1993 |
| JP | 2004-249722 A | 9/2004 |

(Continued)

OTHER PUBLICATIONS

Official Communication issued in International Patent Application No. PCT/JP2013/064015, mailed on Sep. 3, 2013.

*Primary Examiner* — Saeid Ebrahimi Dehkordy
(74) *Attorney, Agent, or Firm* — Keating & Bennett, LLP

(57) ABSTRACT

A control unit in an MFP determines whether a connection request from a communication device carried by a user has been received. If the control unit determines that the connection request has been received, then the control unit issues network identification information and transmits it to the communication device. When a connection is established, the control unit automatically alters the operation screen to an operation screen related to image processing based on the information transmitted/received to/from the communication device, and accepts an operation to execute image processing.

10 Claims, 18 Drawing Sheets

(51) Int. Cl.
*G06F 3/12* (2006.01)
*H04N 1/32* (2006.01)

(52) U.S. Cl.
CPC *H04N2201/0075* (2013.01); *H04N 2201/0094* (2013.01)

(56) References Cited

U.S. PATENT DOCUMENTS

| | | |
|---|---|---|
| 2005/0279835 A1 | 12/2005 | Groeneboer et al. |
| 2007/0201363 A1 | 8/2007 | Narukawa et al. |
| 2007/0253035 A1 | 11/2007 | Takesada |
| 2009/0290191 A1 | 11/2009 | Imaoka |
| 2011/0122434 A1* | 5/2011 | Kim ............... G06F 3/1203 358/1.15 |

FOREIGN PATENT DOCUMENTS

| | | |
|---|---|---|
| JP | 2005-057549 A | 3/2005 |
| JP | 2005-114790 A | 4/2005 |
| JP | 2006-014319 A | 1/2006 |
| JP | 2006-060679 A | 3/2006 |
| JP | 2007-215070 A | 8/2007 |
| JP | 2007-300480 A | 11/2007 |
| JP | 2009-284213 A | 12/2009 |

* cited by examiner

F I G. 4
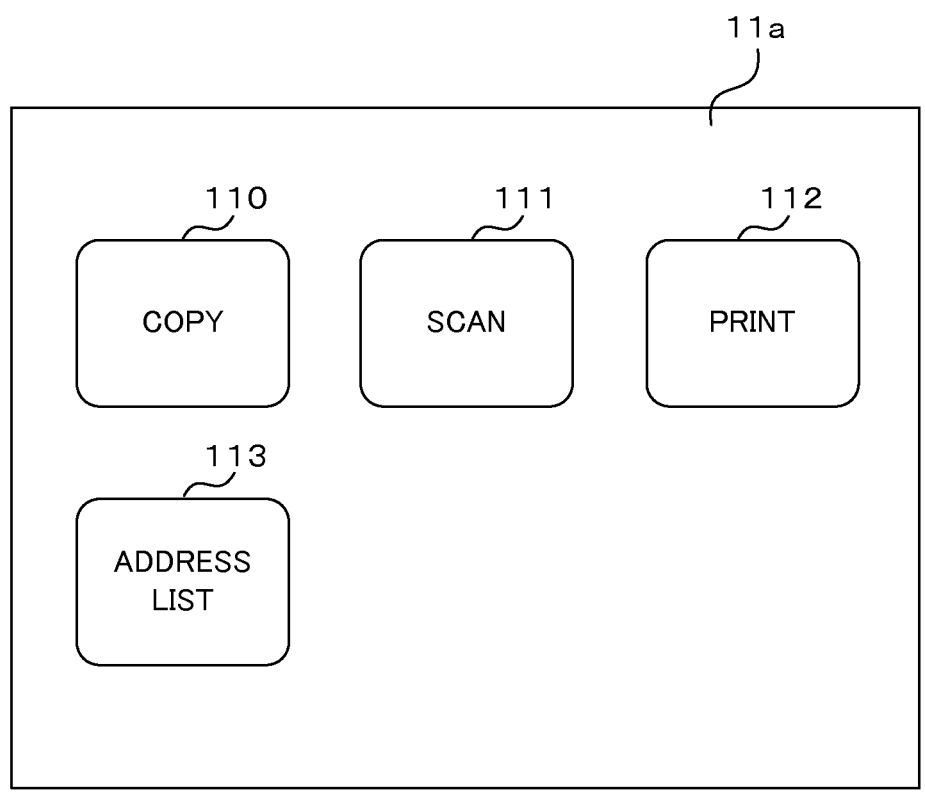

F I G. 5
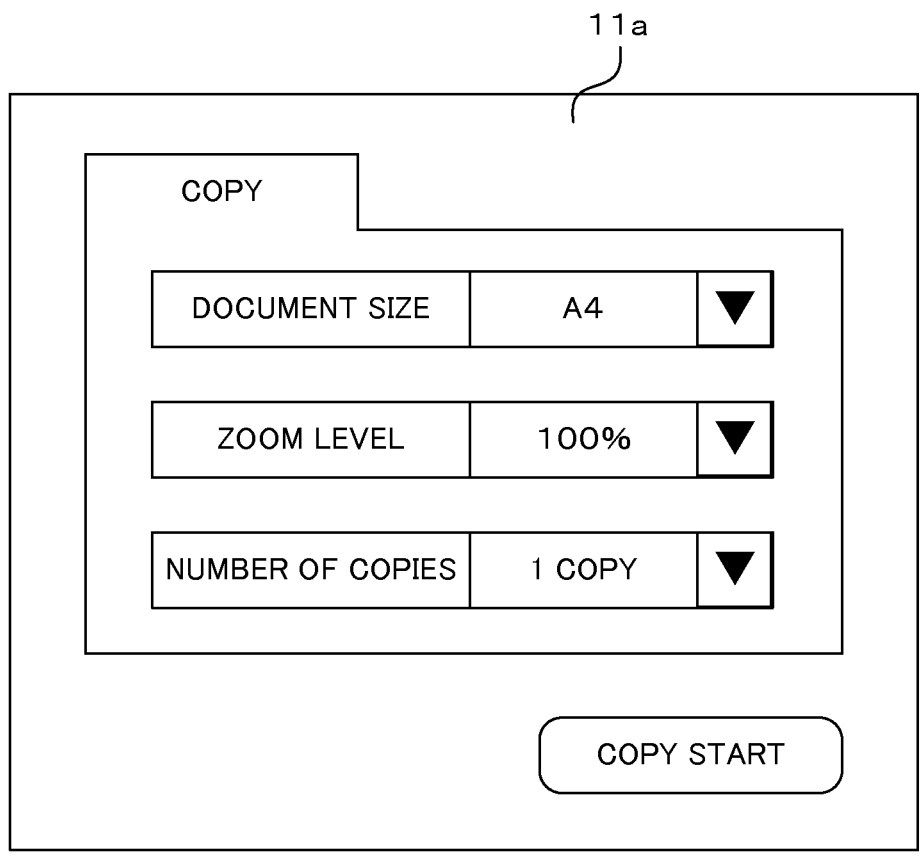

F I G. 6
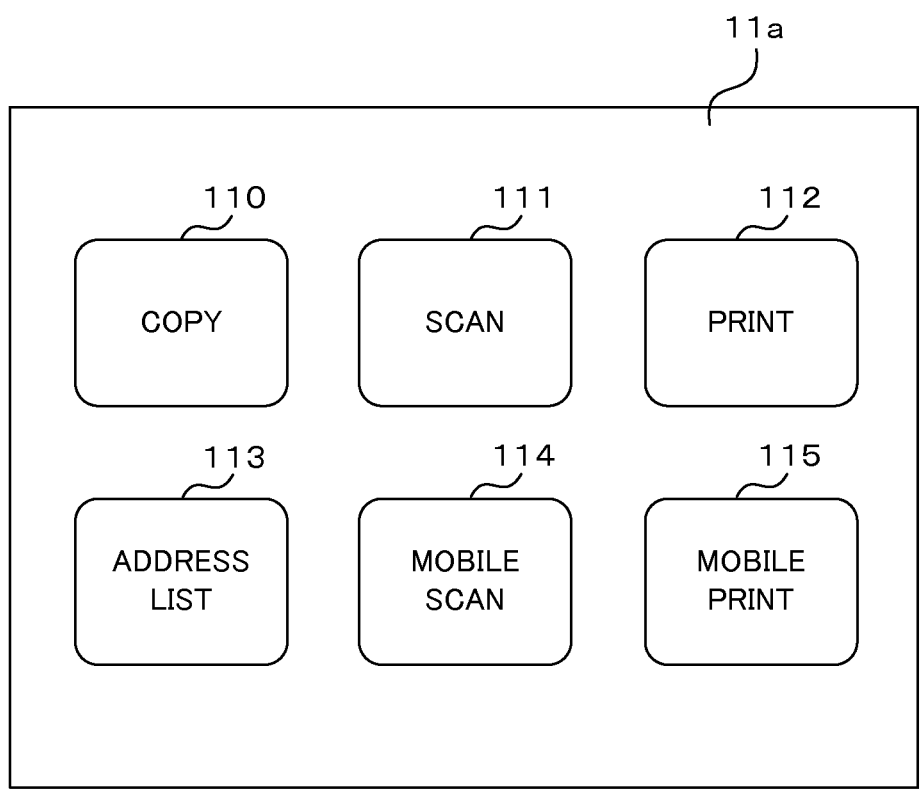

F I G. 7
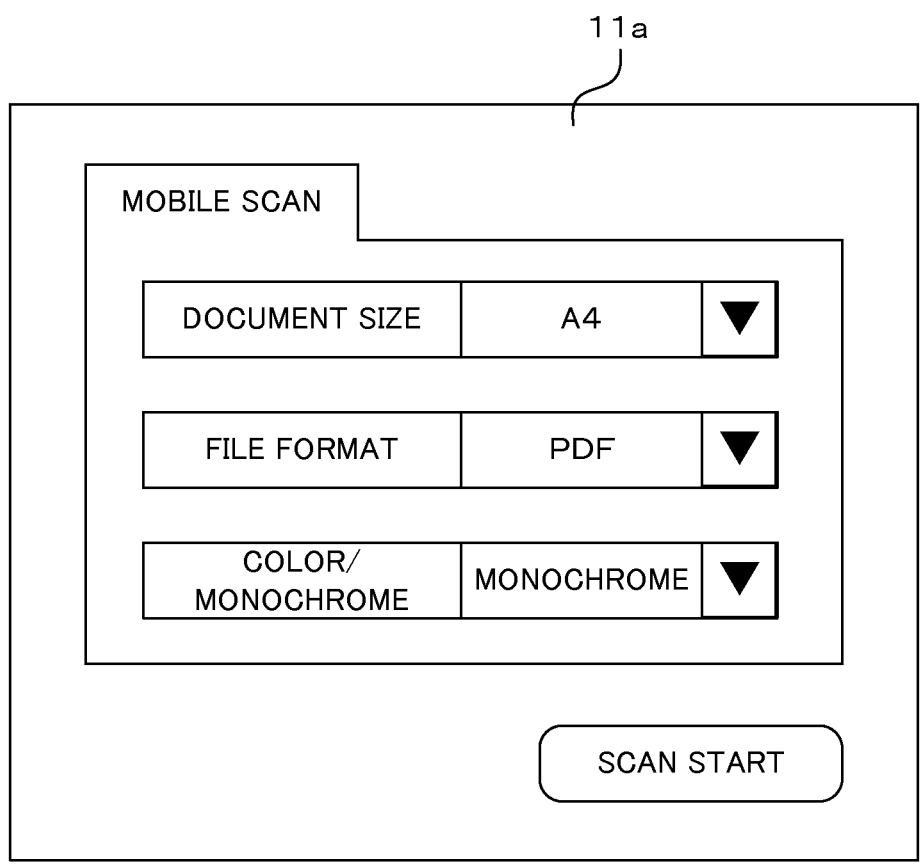

F I G. 1 2
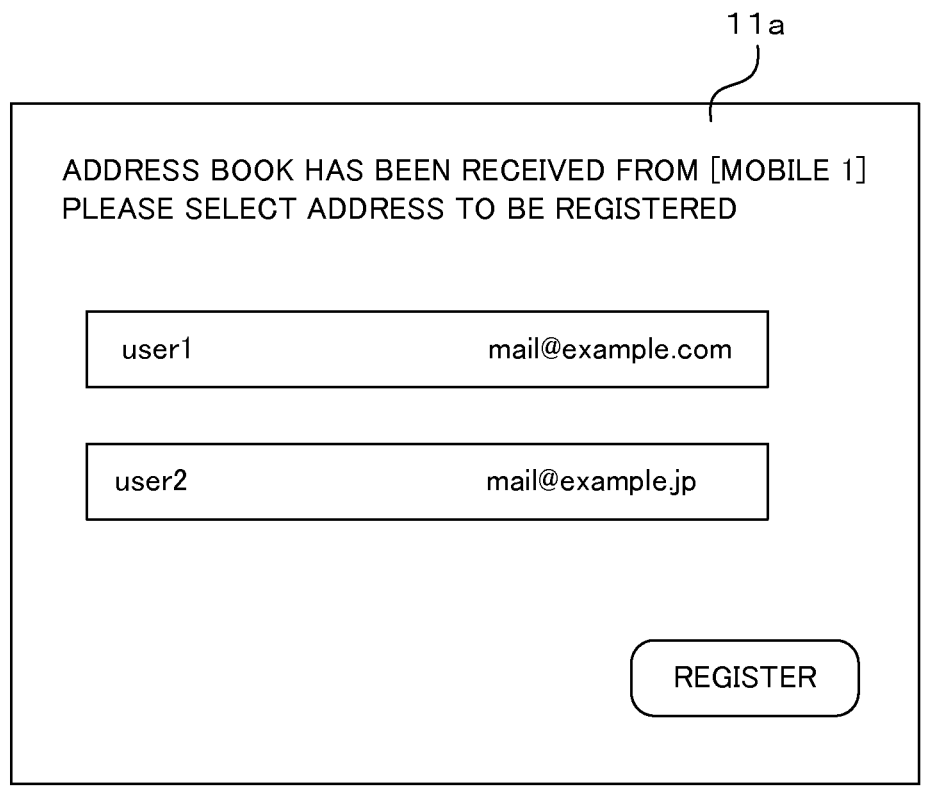

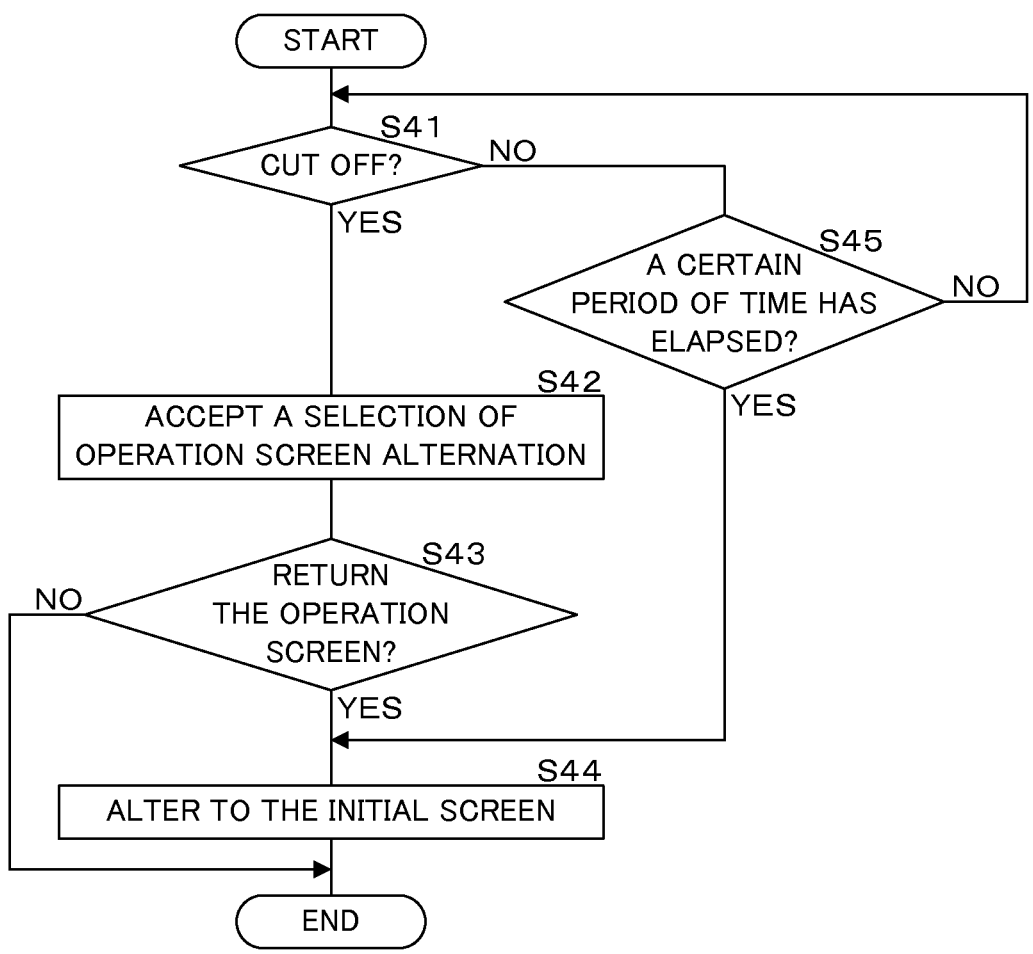
F I G. 1 3

F I G. 1 4
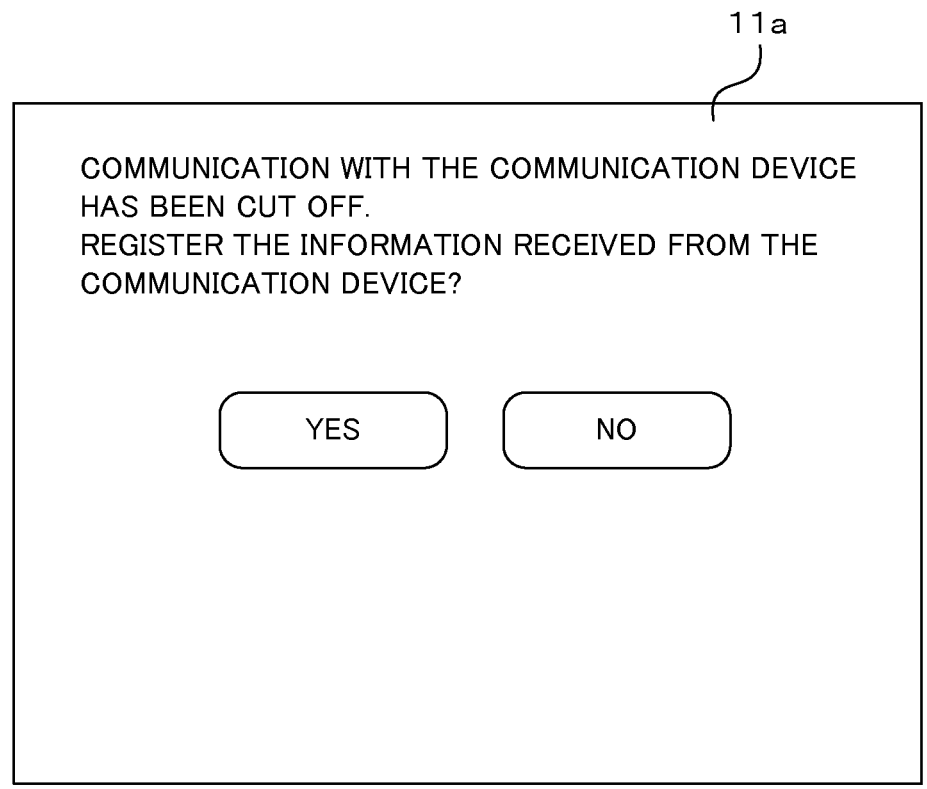

F I G. 1 6
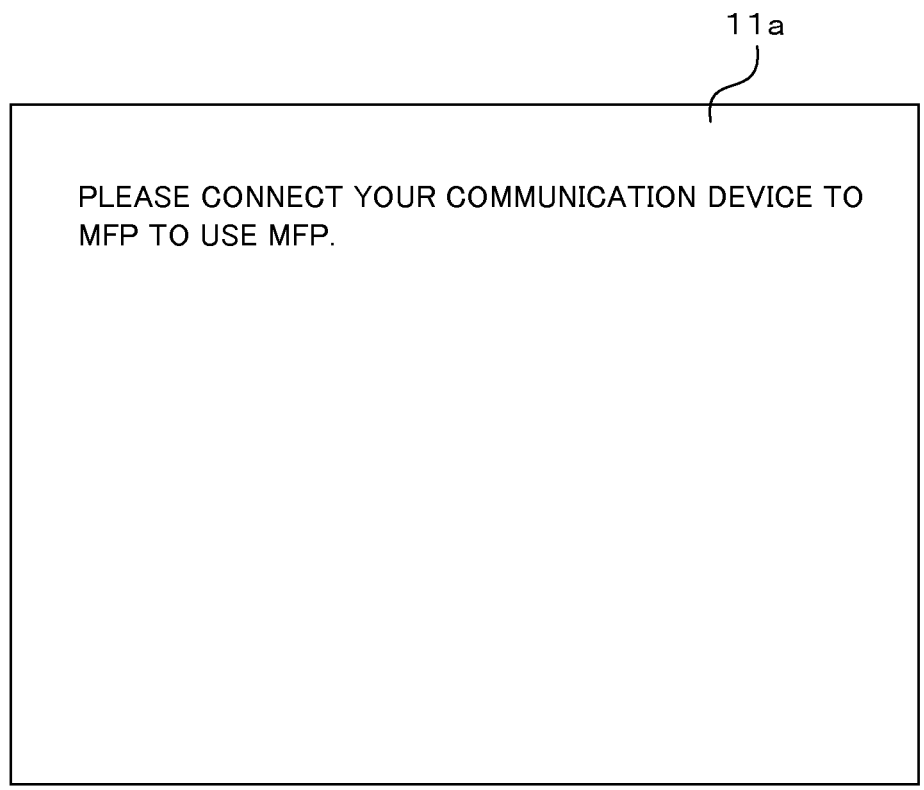

IMAGE PROCESSING DEVICE AND IMAGE PROCESSING SYSTEM

CROSS-REFERENCE TO RELATED APPLICATION

This application is the national phase under 35 U.S.C. §371 of PCT International Application No. PCT/JP2013/064015 which has an International filing date of May 21, 2013 and designated the United States of America.

BACKGROUND

1. Technical Field

The present invention relates to an image processing system in which an image processing device transmits and receives information related to image processing to and from a communication device through wireless communication. In particular, the present invention relates to an image processing device capable of improving operability and an image processing system including the image processing device.

2. Description of Related Art

Portable communication devices, so-called smartphones, have widely been used. This kind of communication device is highly convenient since it is able to have various functions by adding various applications in addition to functions such as a camera, a game, and a media player.

Recently, techniques in which a communication device is connected through wireless communication to a network where an MFP (Multi-Function Peripheral) provided with a wireless communication function is connected and in which the communication device transmits and receives information to and from the MFP have widely been used. In particular, a system has been realized that it is possible to directly print out image data by an MFP without using a storage medium, a USB (Universal Serial Bus) cable, a personal computer or the like by transmitting the image data to the MFP in a network through wireless communication from a communication device having a camera function. In addition, mechanisms in which an MFP transmits image data obtained by reading a document to a communication device also have been suggested.

Operations such as registering information of a network connected to an MFP into a communication device for establishing communication between the communication device and the MFP to transmit and receive data each other are required of a user. Moreover, in order to cause the MFP to transmit data to a communication device, a user has to operate registration of the address information of the communication device into the MFP. In a case where such an operation is complicated, a user may perform an erroneous operation and may keep away from using the MFP. Accordingly, it is required to resolve a complicated operation.

Japanese Patent Application Laid-Open No. 2007-300480 discloses an invention capable of displaying one-touch keys for a user and an address book to an MFP connected to a LAN (Local Area Network) when the user operates a drag-and-drop operation of a setting file into a setting screen of a web browser on a client PC (personal computer) connected to the LAN.

SUMMARY

Since a portable information terminal device capable of directly communicating with an MFP has been realized, it is required to provide a configuration with further improved operability omitting a setting operation or the like as much as possible and easier utilization. The invention disclosed in Japanese Patent Application Laid-Open No. 2007-300480 can only display an operation screen set for a user, and a user still has to perform an operation for generating a setting for him/herself. Accordingly, it can be said that improvement of operability and simplification of an operation are still insufficient.

The present invention has been made with the aim of solving the above problems. And it is an object of the present invention to provide an image processing device which can further improve operability and an image processing system including the image processing device.

An image processing device according to the present invention comprises: a display unit for displaying an operation screen for accepting an operation; an accepting unit for accepting an operation corresponding to the operation screen; and an image processing unit for executing image processing corresponding to the operation accepted by the accepting unit. The image processing device according to the present invention further comprises: a wireless communication unit for executing wireless communication; a connection detecting unit for detecting a connection with an external device through the wireless communication unit; and an altering unit for altering the operation screen displayed in the display unit to an operation screen for accepting an operation related to image processing based on information transmitted/received to/from the external device in a case where the connection detecting unit detects the connection.

In the image processing device according to the present invention, the image processing unit includes a generating unit for generating image data, and the altering unit alters the screen being displayed in the display unit to an operation screen including an interface for accepting an instruction to generate image data by the generating unit.

The image processing device according to the present invention further comprises a preparing unit for preparing reference information for supplying image data generated by the generating unit to the external device, based on the information received from the external device in connection.

In the image processing device according to the present invention, the image processing unit includes a printing unit for printing image data, and the altering unit alters the screen being displayed in the display unit to an operation screen including an interface for accepting an instruction to print image data by the printing unit.

The image processing device according to the present invention comprises a storage unit for storing information received from the external device, and the altering unit alters the screen being displayed in the display unit to an operation screen including an interface for accepting a selection of information to be stored in the storage unit.

The image processing device according to the present invention further comprises: a cut-off detecting unit for detecting that a connection with the external device through the wireless communication unit has been cut off; and a unit for altering an operation screen altered by the altering unit to a predetermined operation screen in a case where the cut-off detecting unit detects the cut-off.

In the image processing device according to the present invention, the wireless communication unit is configured to execute communication with the external device directly.

In the image processing device according to the present invention, the accepting unit is configured to accept an operation corresponding to the operation screen after the connection detecting unit detects the connection.

The image processing device according to the present invention further comprises a screen generating unit for generating an operation screen based on information received from the external device in connection, and the altering unit is configured to alter the screen being displayed in the display unit to an operation screen generated by the screen generating unit.

An image processing system according to the present invention comprises: an image processing device provided with a display unit for displaying an operation screen for accepting an operation, an accepting unit for accepting an operation corresponding to the operation screen, an image processing unit for executing image processing corresponding to the operation accepted by the accepting unit, and a wireless communication unit for executing wireless communication; and a communication device capable of connecting to the image processing device through wireless communication. In the image processing system according to the present invention, the image processing device includes a connection detecting unit for detecting a connection with the communication device through the wireless communication unit, and an altering unit for altering an operation screen displayed in the display unit to an operation screen for accepting an operation related to image processing based on information transmitted/received to/from the communication device in a case where the connection detecting unit detects the connection.

According to the present invention, in a case where a communication device is connected to an image processing device accepting an operation corresponding to an operation screen to execute image processing, the image processing device alters the displayed screen to an operation screen for image processing related to information transmitted/received to/from the communication device. Therefore, operation for causing the image processing device to execute transmission/reception of information to/from the communication device and to execute information processing related to the information can be simplified.

According to the present invention, in a case where a function of generating image data and a function of transmitting the generated image data to a communication device connected to an image processing device or to other devices have been realized in the image processing device, an operation screen including an interface for accepting an instruction to generate image data is automatically displayed in a display unit of the image processing device. Therefore, it is possible for a user to easily use the function.

According to the present invention, in a case where an instruction to generate image data is accepted through an interface included in an operation screen after alternation, image acquisition information (hereinafter referred to as "reference information") for obtaining the generated image data from a communication device connected to the image processing device or from other communication devices is automatically prepared. Therefore, a variety of settings for receiving information in a communication device can be omitted.

According to the present invention, in a case where a function of printing based on image data obtained from a communication device connected to an image processing device or from other devices have been realized in the image processing device, an operation screen including an interface for accepting an instruction to print is automatically displayed in a display unit of the image processing device. Therefore, it is possible for a user to easily use the function.

According to the present invention, in a case of storing information received from a communication device connected to an image processing device, an operation screen for accepting a selection of information to be stored is automatically displayed in the display unit of the image processing device. Therefore, the operation of the image processing device can be simplified.

According to the present invention, in a case where the communication with a communication device has been cut off, an image processing device automatically detects the cut-off and returns an operation screen to the operation screen in default. Therefore, no erroneous operation is accepted.

According to the present invention, an image processing device and a communication device directly execute communication, for example, in an ad-hoc mode. Therefore, the image processing device is controlled such that the connection with only one communication device is established.

According to the present invention, as reference information for supplying image data generated in an image processing device, IP (Internet Protocol) address information of a communication device connected to the image processing device, e-mail address information or telephone number information may be generated. In addition, a destination to which the generated image data is supplied is not restricted to the communication device being connected, but may be other communication device or a recording device that is accessible from the other communication device. In this case, the reference information is path information in the recording device or URL (Uniform Resource Locator) information, and it is possible for an external communication device to obtain the generated image data based on path information or URL information. Since the reference information as described above is prepared in the image processing device, the operation of the external communication device can be simplified.

According to the present invention, an image processing device may automatically obtain a list of image data to be printed from a communication device being connected or from an external device including other communication device and may display the list so as to be selectable in the display unit. Therefore, the operation until the execution of printing can be simplified.

In a case of returning an operation screen to the operation screen in default after the communication with a communication device is cut off, it may be configured to return the operation screen when a user confirms an alternation and selects an alternation. In this case, the user's operation can be simplified.

Moreover, even if a communication device is connected to an image processing device, in a case where an operation is not performed for a prescribed period or longer, a screen may be configured to be returned to an original predetermined operation screen so that accepting an erroneous operation can be prevented.

An operation related to image processing in an image processing device may be accepted only in a case where a communication device is connected to the image processing device from outside through wireless connection. Therefore, it is possible to prevent the complication of the operation related to image processing.

According to the present invention, since an operation in an image processing device is automatically altered in response to the presence or absence of a communication device connected to the image processing device through wireless communication, the operation of image processing related to wireless communication can be simplified. This can further improve user operability. In addition, the connection with only one communication device is controlled to be established so that the complication of image processing based on information transmitted from a plurality of communication devices can be prevented.

The above and further objects and features will more fully be apparent from the following detailed description with accompanying drawings.

BRIEF DESCRIPTION OF THE SEVERAL VIEWS OF THE DRAWINGS

FIG. 4 is an explanatory view showing an example of an initial screen to be displayed in a display unit of the MFP;

FIG. 5 is an explanatory view showing an example of an operation screen of a copy function;

FIG. 6 is an explanatory view showing an example of a screen after alternation to be displayed in the display unit of the MFP;

FIG. 7 is an explanatory view showing an example of an operation screen of a mobile scan function;

FIG. 12 is an explanatory view showing an example of a screen displaying a list of address information received from a communication device;

FIG. 13 is a flowchart showing an example of a processing procedure to be executed in an MFP according to Embodiment 4;

FIG. 14 is an explanatory view showing an example of a screen displayed in the MFP in a case where it is determined that the communication with a communication device has been cut off;

FIG. 16 is an explanatory view showing an example of a message to be displayed in a display unit in Embodiment 5.

DETAILED DESCRIPTION

The following will describe in detail the present invention with reference to the drawings illustrating some embodiments thereof.

Embodiment 1

Figure 1:
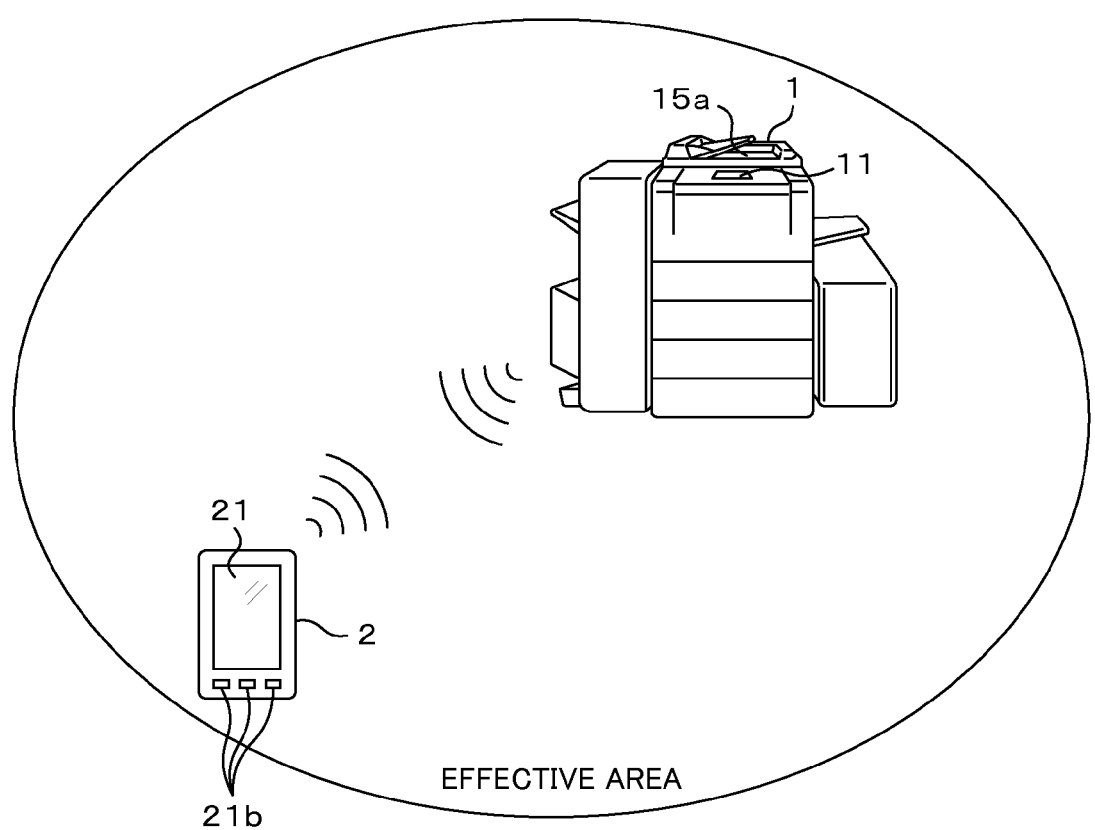
FIG. 1 is a schematic view showing a configuration of an image processing system according to Embodiment 1.
Figure 2:
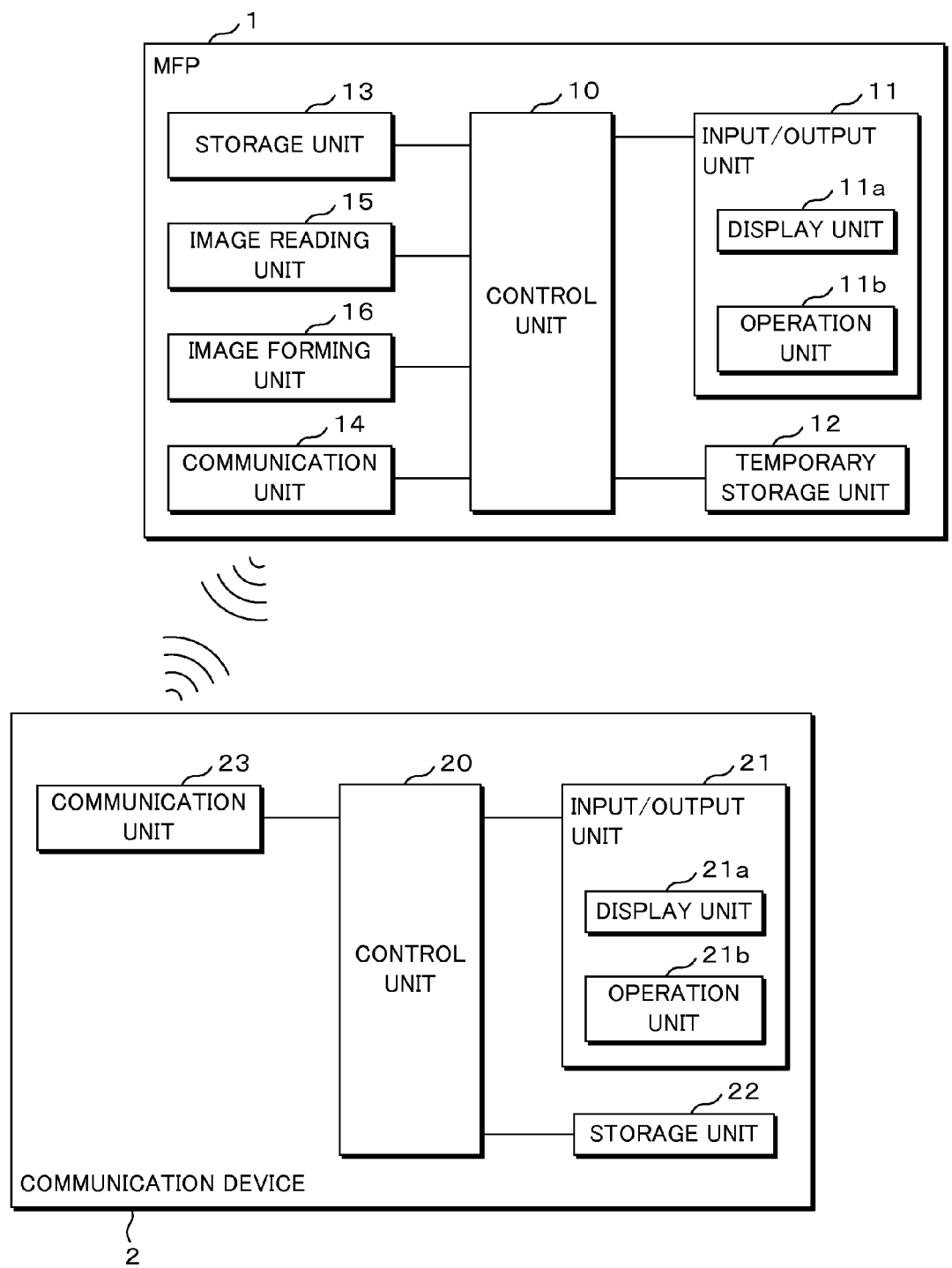
FIG. 2 is a block view showing the configuration of the image processing system according to Embodiment 1.

FIG. 1 is a schematic view showing a configuration of an image processing system according to Embodiment 1 and FIG. 2 is a block view showing the configuration of the image processing system according to Embodiment 1. The image processing system includes an MFP (Multi-Function Peripheral) 1 installed in an enterprise, a public facility, a house or the like and a communication device 2 carried by a user. The MFP 1 directly establishes a connection through wireless communication with one communication device 2 existing in an effective area of wireless communication in an ad-hoc mode. The MFP 1 may also be connected to a LAN in an enterprise, a public facility, a house or the like in addition to a communication connection with the communication device 2, or it may also be connected to an external internet.

According to the present invention, the operation to be performed by a user carrying the communication device 2 can be simplified as much as possible while the MFP 1 executes scanning or printing based on information from the communication device 2 carried by a user in the image processing system.

The MFP 1 is an image processing device provided with a reading function (a scanner), a printout function (a printer), a FAX function and the like to execute processing for image data. The MFP 1 includes a control unit 10 controlling each of configuration units, an input/output unit 11 using a touch panel and a Liquid Crystal Display (LCD), a temporary storage unit 12, a storage unit 13 storing various types of information, a communication unit 14 realizing communication with the communication device 2, an image reading unit 15 realizing a reading function, and an image forming unit 16 realizing a printout function. The MFP 1 has configuration units for realizing many functions such as a FAX communication unit executing FAX communication through a telephone network, which will not be illustrated or described here in detail.

The control unit 10 uses a CPU (Central Processing Unit) to control various configuration units based on control programs stored in a built-in ROM (Read Only Memory).

The input/output unit 11 includes a display unit 11a using an LCD and an operation unit 11b using a touch panel. For the operation unit 11b, not only a touch panel but hardware keys may also be used. With respect to the display unit 11a displaying an operation screen including various kinds of icons or buttons and accepting an operation from a user, the operation unit 11b detects a position (an operating position) on the touch panel touched by a user. The control unit (accepting unit) 10 is able to identify which icon or button has been touched based on the information of the position touched by a user and the positional information of the icons or buttons displayed in the display unit 11a. It is also possible for the control unit 10 to identify which hardware keys has been pressed.

The temporary storage unit 12 uses a RAM such as a DRAM (Dynamic Random Access Memory), an SRAM (Static Random Access Memory) or the like. The temporary storage unit 12 stores temporary information for a variety of processes generated in the processing of the control unit 10. In addition, the temporary storage unit 12 stores an access key (permission information) for accessing a scanner or printer function of the MFP 1 through wireless communication. The access key will be detailed later.

The storage unit 13 uses an HDD (Hard Disk Drive) or an SSD (Solid State Drive). The storage unit 13 may store address information for a FAX function, an e-mail communication function, and an FTP (File Transfer Protocol) communication function. The storage unit 13 may also store, for example, image data read by the image reading unit 15 or image data received through the communication unit 14.

The communication unit 14 realizes a wireless communication function. The control unit 10 is able to transmit and receive data to and from the communication device 2 through wireless communication by the communication unit 14. The communication unit 14 is configured to connect to one communication device 2 in an ad-hoc mode and configured not to connect to a plurality of communication devices 2 at the same time. The communication unit 14 has an access point function, that is, a base unit function in a wireless LAN system. The communication executed by the communication unit 14 is not restricted to an ad-hoc mode. If a state where the communication unit 14 is connected to a plurality of communication devices 2 at the same time can be eliminated, other methods can also be adopted. The communication unit 14 may be an interface such as a non-illustrated USB (Universal Serial Bus) included in the MFP 1, in this case, the communication may be realized by connecting a wireless communication device having an access point function to the interface.

For the image reading unit 15, a scanner unit is used. The scanner unit is a reading device for optically reading a document placed on a scanner platen 15a or a document tray, and the scanner unit includes an optical unit and a control unit for controlling a reading operation executed by the optical unit inside the main unit of the MFP 1. The image reading unit 15 outputs image data obtained by reading a document to a predetermined image memory, so that the control unit 10 is able to obtain the image data from the image memory.

For the image forming unit 16, a printer unit is used. The printer unit is disposed below the scanner unit inside the main unit of MFP 1. The printer unit generates a toner image based on image data given from the control unit 10, and transfers the toner image onto a sheet of paper to execute image formation.

The communication device 2 corresponds to a portable telephone machine, i.e. a so-called smartphone. The communication device 2 may also be a tablet PC (personal computer). The communication device 2 includes a control unit 20 controlling each of configuration units, an input/output unit 21 using a touch panel, a storage unit 22 storing various types of information, and a communication unit 23 realizing communication with the MFP 1 via the access point AP.

The control unit 20 uses a CPU to control each of configuration units based on control programs stored in a built-in ROM.

The input/output unit 21 includes a display unit 21a using an LCD and an operation unit 21b using a touch panel and hardware keys. With respect to the display unit 21a displaying various kinds of icons or buttons, the operation unit 21b detects a position on the touch panel touched by a user and notifies the control unit 20 of the information of the position touched by the user. The control unit 20 is able to identify which icon or button has been touched based on the positional information of the icons or buttons displayed in the display unit 21. When a hardware key is pressed, the operation unit 21b notifies the control unit 20 of information for identify which key has been pressed.

The storage unit 22 uses a RAM and a flash memory. In the flash memory of the storage unit 22, an application program (hereinafter referred to as a print scanning application) used for printing (printout) an image data or for reading (scan) a document in the MFP 1 connected to the network N is stored. The control unit 20 reads out and executes the print scanning application stored in the storage unit 22, to realize communication with the MFP 1 and transmission/reception of image data to/from the MFP 1, which will be described later.

Furthermore, the storage unit 22 stores the setting information such as setting for resolution of the image data to be received, a file type (format), color/monochrome, size of an document to be read and size of image data to be generated (the presence or absence of reduction) so as to correspond to the print scanning application. The setting information may include a print size setting for printing based on image data to be transmitted, a color/monochrome setting, a printing quality setting or the like. The setting information is initially set in the print scanning application and may later be edited by the user through the print scanning application. The setting information may be stored individually in each of different MFPs. The username (user ID) of the communication device 2 may also be included in the setting information.

In the storage unit 22, image data may be stored in the flash memory. The control unit 20 can transmit image data stored in the flash memory of the storage unit 22 to the MFP 1 through the communication unit 23. In addition, the image data received through the communication unit 23 may be stored either temporarily in the RAM of the storage unit 22 or the flash memory for saving.

In the storage unit 22, information of an address book is stored in the flash memory. The control unit 20 can also transmit an e-mail by a mail function based on the information of the address book stored in the flash memory of the storage unit 22.

The communication unit 23 realizes a wireless communication function. The communication unit 23 can connect to the communication unit 14 of the MFP 1 and transmit/receive a variety of information including image data to/from the MFP 1 based on the instruction obtained from the control unit 20.

In the image processing system configured as described above, the procedure for altering a screen to be displayed in the MFP 1 when the communication device 2 is connected to the MFP 1 will be described with reference to the flowchart and examples of operation screens.

Figure 3:
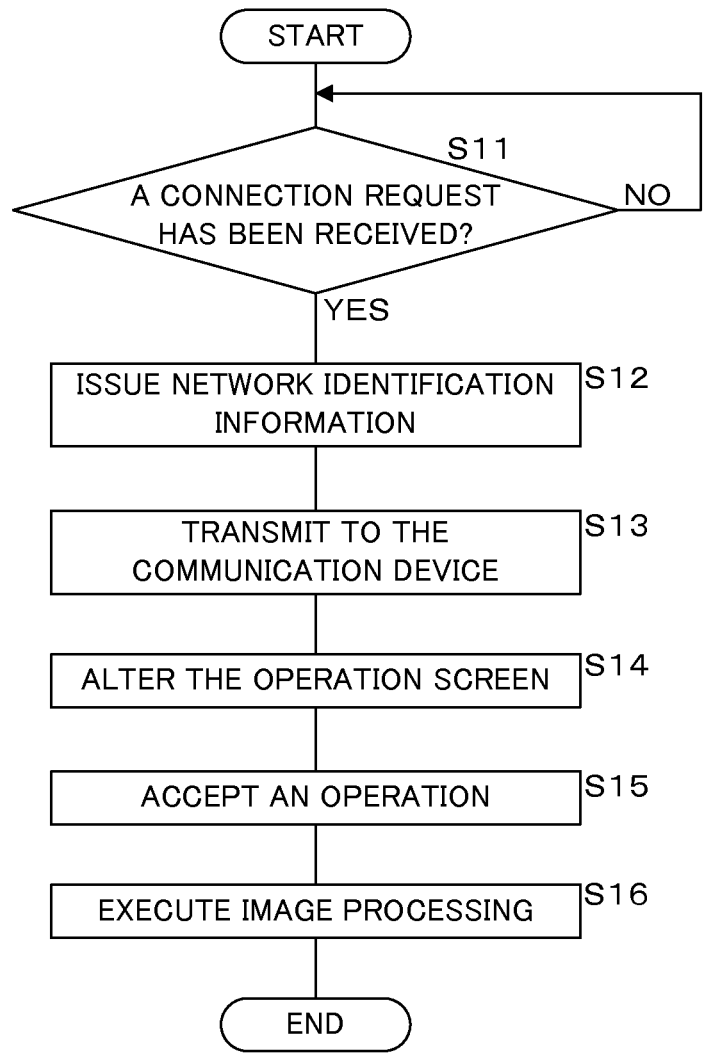
FIG. 3 is a flowchart showing an example of a screen alternation procedure to be executed in an MFP according to Embodiment 1.

FIG. 3 is a flowchart showing an example of a screen alternation procedure to be executed in the MFP 1 according to Embodiment 1.

The control unit 10 of the MFP 1 determines whether a connection request from the communication device 2 has been received through the communication unit 14 (Step S11). If the control unit 10 determines that the connection request has not been received (S11: NO), the control unit 10 returns the processing to Step S11, and then waits until it is determined that the connection request has been received.

Meanwhile, the control unit 20 of the communication device 2 searches for an access point, that is, the communication unit 14 of the MFP 1, obtains identification information such as SSID of the MFP 1, and transmits the connection request to the MFP 1 based on the obtained identification information. The control unit 20 may obtain the SSID of the MFP 1 directly inputted by a user through the operation unit 21b without performing a search.

At Step S11, if the control unit 10 of the MFP 1 determines that the connection request has been received (S11: YES), the control unit 10 issues network identification information of the communication device 2 to establish a wireless communication connection with the communication device 2 (Step S12), and then transmits the network identification information to the communication device 2 (Step S13). As the network identification information, for example, the control unit 10 assigns an IP address such as "192.168.0.20" to the communication device 2 in a case where the IP address of the communication unit 14 of the MFP 1 is "192.168.9.10." Therefore, a wireless communication connection is established between the MFP 1 and the communication device 2, and the control unit (connection detecting unit) 10 of the MFP 1 detects a connection with the communication device 2.

Next, the control unit (altering unit) 10 alters the operation screen displayed in the display unit 11a to an operation screen related to image processing based on the information transmitted/received to/from the communication device 2 (Step S14), and then waits.

Subsequent to Step S14, the control unit 10 accepts an operation corresponding to the operation screen after alternation (Step S15), executes image processing such as scanning by the image reading unit 15 or printing by the image forming unit 16, in response to the operation (Step S16), and then terminates processing.

FIG. 4 is an explanatory view showing an example of an initial screen to be displayed in the display unit 11*a* of the MFP 1. In the initial screen (default screen), icons 110 to 113 indicating functions not requiring the communication device 2 among a variety of functions executable by the MFP 1 are displayed. In the screen example shown in FIG. 4, the initial screen includes the icon 110 for starting a copy, the icon 111 for executing scanning (image reading), the icon 112 for executing printing (printout), and the icon 113 for selecting and editing address information to be registered in the storage unit 13 of the MFP 1. When a user touches the touch panel on any one of icons 110 to 113, each of functions can be executed in the MFP 1. For example, when a user touches the touch panel on the icon 110 with a finger or the like, the control unit 10 detects the action and displays an operation screen including setting information for executing a copy function in the display unit 11*a*.

FIG. 5 is an explanatory view showing an example of an operation screen of a copy function. When the copy function is selected, pull-down menus which can be used for setting the document size, zoom level, number of copies and the like as well as a copy start button for executing a copy are displayed in the display unit 11*a* as shown in FIG. 5. When a user touches the touch panel on the copy start button after setting each item, a copy of a document placed on the scanner platen 15*a* can be printed out.

A screen to be altered from the initial screen shown in FIG. 4 by connecting the communication device 2 to the MFP 1 will be described. FIG. 6 is an explanatory view showing an example of the screen after alternation to be displayed in the display unit 11*a* of the MFP 1. In the example of the screen shown in FIG. 6, an icon 114 named "mobile scan" and an icon 115 named "mobile print" are added to the initial screen shown in FIG. 4. As a user touches the touch panel on the icon 114, the MFP 1 can execute a function of supplying image data obtained by scanning a document to the communication device 2 or other communication devices. In addition, as a user touches the touch panel on the icon 115, the MFP 1 can execute a function for printing based on image data stored in the communication device 2 or other communication devices. For example, in the state of displaying the screen shown in FIG. 6 in the display unit 11*a*, when a user touches the touch panel on the icon 114, the control unit 10 detects the action and displays an operation screen for executing a mobile scan function in the display unit 11*a*.

FIG. 7 is an explanatory view showing an example of an operation screen of a mobile scan function. When the mobile scan function is selected, as shown in FIG. 7, a pull-down menu which can be used for setting the size of a document to be read, a file format of image data to be generated, and a color/monochrome setting and the like as well as a scan start button (interface) for executing scanning are displayed in the display unit 11*a*. The pull-down menu may also include resolution when reading, a compression format, a compression ratio and the like. When a user touches the touch panel on each item in the pull-down menu, the control unit 10 displays selectable choices for each of the items to obtain the selected information. Therefore, a user can edit setting information for scanning. As a user touches the touch panel on the scan start button after setting each of the items, the scanning of a document placed on the scanner platen 15*a* is started.

When the control unit 10 of the MFP 1 detects through the operation unit 11*b* that the touch panel on the scan start button displayed in an example of a screen shown in FIG. 7 is touched, the control unit 10 reads a document placed on the scanner platen 15*a* by the image reading unit (generating unit) 15, to generate image data. In other words, at Step S16 in the processing procedure shown in the above-described flowchart, the control unit 10 generates image data by reading the document and executes processing for transmitting the generated image data to the communication device 2 based on the issued network identification information.

Therefore, a user can easily recognize and select an interface for realizing a function related to the communication device 2 through the operation screen altered by the connection with the communication device 2 carried by the user. The MFP 1 can issue network identification information to the communication device 2 through an access point function and identify a destination. Thus, while transmitting image data obtained by executing scanning, it is not necessary for a user to perform an operation such as operating the operation unit 11*b* of the MFP 1 to register destination information. Since the communication device 2 and the MFP 1 execute communication in an ad-hoc mode, the connections with communication devices carried by a plurality of users respectively are not intermingled. Accordingly, while one user operates the MFP 1 to which the communication device 2 is connected, the user carrying another communication device 2 cannot operate the MFP 1 so that erroneous transmission will not occur.

Embodiment 2

According to Embodiment 2, the MFP 1 executes processing for requesting the communication device 2 to transmit information related to a destination to be supplied an image data or image data stored in the communication device 2 or a variety of information stored in the communication device 2, and executes processing based on the information received from the communication device 2.

A hardware configuration in an image processing system according to Embodiment 2 is similar to the configuration according to Embodiment 1. Accordingly, the configuration units common to those in Embodiment 1 are denoted by the same reference numerals and will not be described in detail.

Figure 8:
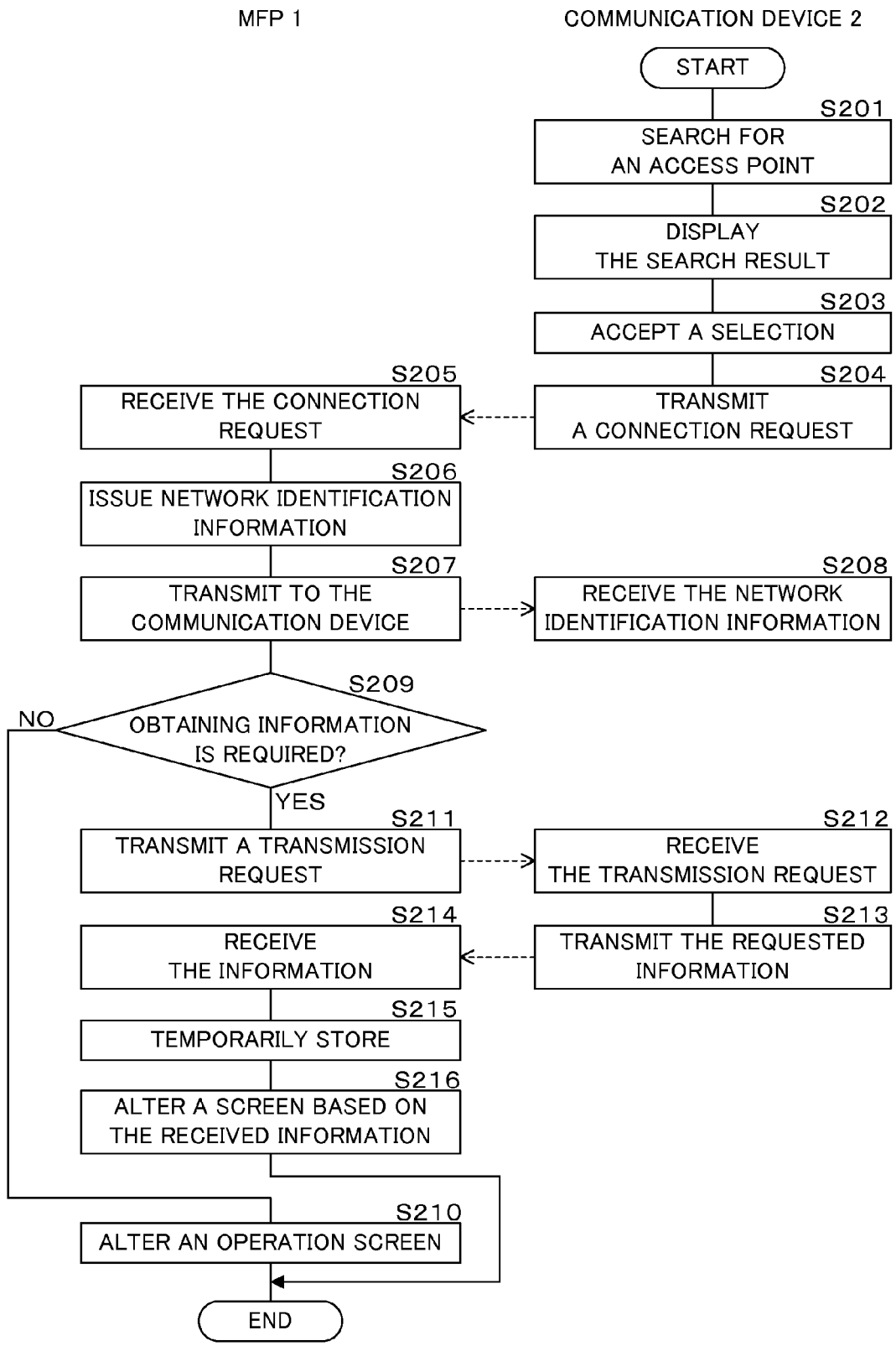
FIG. 8 is a flowchart showing an example of a processing procedure to be executed in an image processing system according to Embodiment 2.

FIG. 8 is a flowchart showing an example of a processing procedure to be executed in the image processing system according to Embodiment 2.

A control unit 20 of the communication device 2 searches for an access point through a communication unit 23 in a case where a print scanning application is activated (Step S201). The control unit 20 displays information of the access point being a search result in the display unit 21*a* (Step S202), and accepts a selection of the access point corresponding to an MFP 1 (Step S203). The control unit 20 transmits a connection request to the access point of the MFP 1 (communication unit 14) (Step S204). At Step S204, the control unit 20 of the communication device 2 transmits a connection request including an execution request indicating the content of image processing in a case where image processing to be executed in the MFP 1 such as scanning or printing is determined.

The control unit 10 of the MFP 1 receives the connection request from the communication device 2 (Step S205), and issues network identification information of the communication device 2 to establish a wireless communication connection with the communication device 2 (Step S206). The control unit 10 transmits the issued network identification information to the communication device 2 (Step S207).

The control unit 20 of the communication device 2 receives the transmitted network identification information (Step S208). Therefore, the wireless communication connection is established between the MFP 1 and the communication device 2.

The control unit 10 of the MFP 1 determines whether obtaining information from the communication device 2 is required based on the connection request (Step S209). For example, in a case where an execution request is included in the received connection request, and in a case where the content of image processing indicated by the execution request is scanning of image data and a transmission of the image data to the communication device 2, the control unit 10 determines that the information (setting information) for executing scanning is necessary.

In a case where the control unit 10 determines that obtaining information is not required (S209: NO), the control unit 10 alters the screen displayed in the display unit 11a to an operation screen related to image processing based on the information transmitted/received to/from the communication device 2 (Step S210), and then waits. The operation screen displayed at this moment, for example, is the screen to which selectable functions have been added in response to the connection with the communication device 2 as shown in FIG. 6.

At Step S209, if the control unit 10 determines that obtaining information is required (S209: YES), the control unit 10 transmits a transmission request of the required information to the communication device 2 (Step S211).

In the communication device 2, the control unit 20 receives the transmission request from the MFP 1 through the communication unit 23 (Step S212), and transmits information in response to the received transmission request (Step S213). For example, the control unit 20 transmits setting information read from the flash memory of the storage unit 22 through the communication unit 23.

The control unit 10 of the MFP 1 receives the information requested at Step S211 (Step S214), and temporarily stores the received information in the temporary storage unit 12 (Step S215). The control unit 10 alters an operation screen based on the received information (Step S216) and then waits. The operation screen displayed at this moment, for example, corresponds to an operation screen in response to the function to be executed, as shown in FIG. 7.

Therefore, it is possible to simplify the operation to be performed by a user in the MFP 1 and the communication device 2.

At Step S209, the following example is considered as information having need to obtain from the communication device 2.

As described above, the control unit 10 of the MFP 1 requires setting information used when executing image processing by a mobile scan, that is, the image reading unit 15. The setting information is information such as the size of a document to be read, a file format of image data to be generated, a color/monochrome setting, resolution, a compression format, and a compression ratio. The control unit 10 reflects the received setting information as a default in the setting/editing screen for the setting information shown in FIG. 7. This makes it highly possible that a user touches the touch panel on the scan start button to execute scanning without performing an operation for altering setting details in the screen shown in FIG. 7.

In addition, the control unit 10 of the MFP 1 may require information of a transmission destination of image data obtained by image processing executed by a mobile scan, that is, the image reading unit 15. In a case where the transmission destination is specified as the connected communication device 2, the information of the transmission destination may be an e-mail address or a telephone number of the communication device 2 other than network identification information issued by the MFP 1. In a case where the transmission destination is specified as a communication device other than the connected communication device 2, the information of the transmission destination may be an e-mail address or a telephone number of this other communication device. When the MFP 1 connects to a LAN in an enterprise, a public facility or a house through a communication function other than the communication unit 14 and another communication device similarly connects to the LAN, the information of the transmission destination may be an IP address of this other communication device within the LAN. In a case where the transmission destination is specified as a recording device which is connectable to the communication device 2 and another communication device, the information of the transmission destination may be an IP address or the like of the recording device.

Moreover, the control unit 10 of the MFP 1 requests image data as to be printed out when executing image processing by a mobile print, that is, the image forming unit 16. The control unit 10 at this moment receives a connection request including a request of executing printing from the communication device 2. The control unit 10 may also request a list composed of compressed thumbnails or image data itself. Moreover, the control unit 10 may request setting information used in printing image data. The setting information for printing may be a print size setting, a color/monochrome setting, a printing quality setting or the like. Thus, a user may select an image to be printed from the list shown in the display unit 11a of the MFP 1 and perform an operation of print start without performing an operation for causing the communication device 2 to transmit image data.

In addition, the control unit 10 of the MFP 1 may request address information in order to add information received from the communication device 2 in an address book of the MFP 1 as the information of a transmission destination of image data obtained by image processing through a mobile scan, that is, the image reading unit 15. In a case where the transmission destination is specified as a communication device other than the communication device 2 and with address information registered in the communication device 2, the user's operation can be simplified by adding the address information registered in the communication device 2 to the address book data in the MFP 1 as the transmission destination.

Embodiment 3

According to Embodiment 3, the MFP 1 detects the connection with the communication device 2 and alters to the operation screen as shown in the screen example of FIG. 6, and the control unit 10 requests the communication device 2 to transmit information corresponding to each operation in a case where the touch panel on an icon 114, an icon 115 or an icon 113 is touched.

A hardware configuration in an image processing system according to Embodiment 3 is similar to the configuration according to Embodiment 1. Accordingly, the configuration units common to those in Embodiment 1 are denoted by the same reference numerals and will not be described in detail.

Figure 9A:
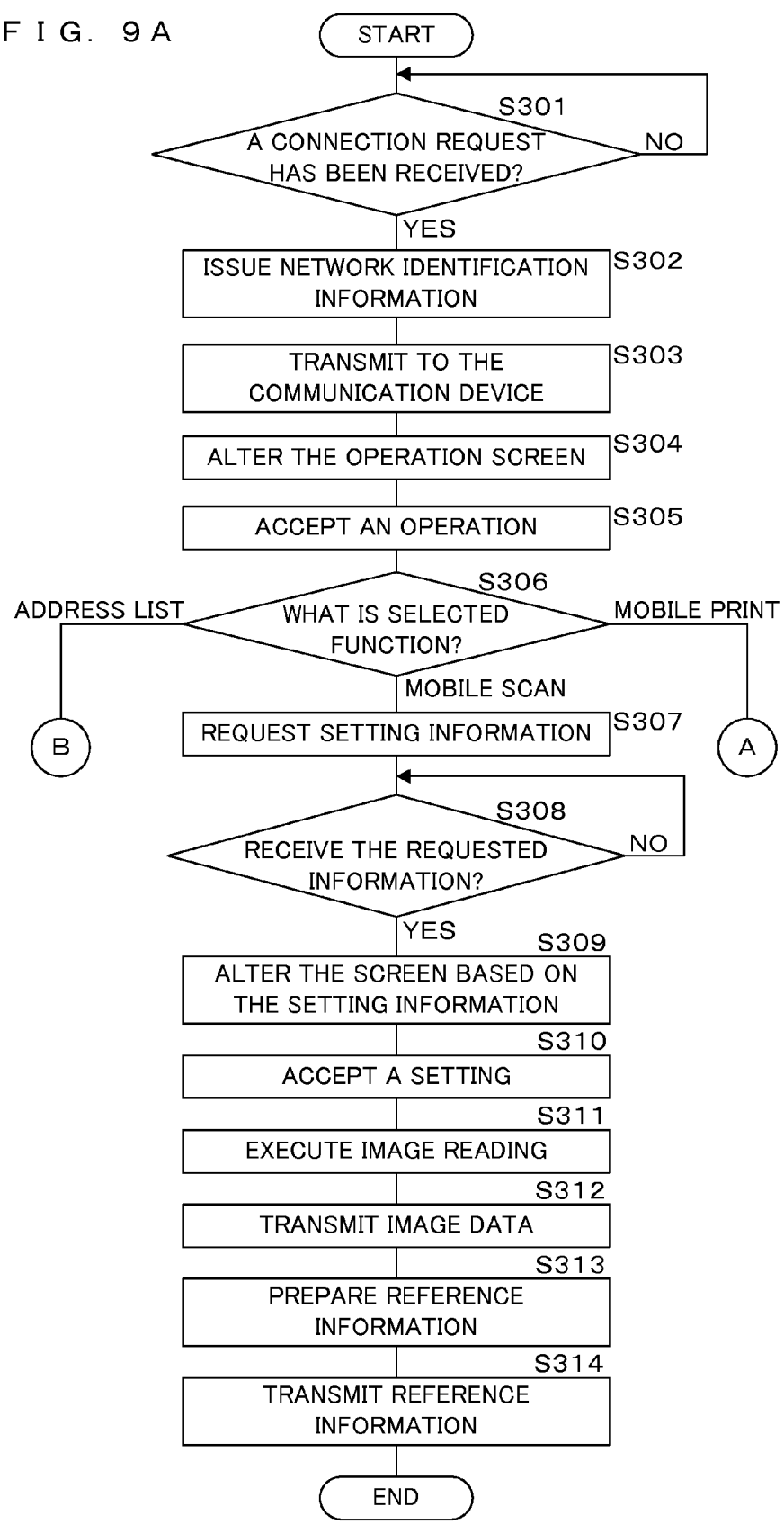
FIG. 9A is a flowchart showing an example of a processing procedure to be executed in an MFP according to Embodiment 3.
Figure 9B:
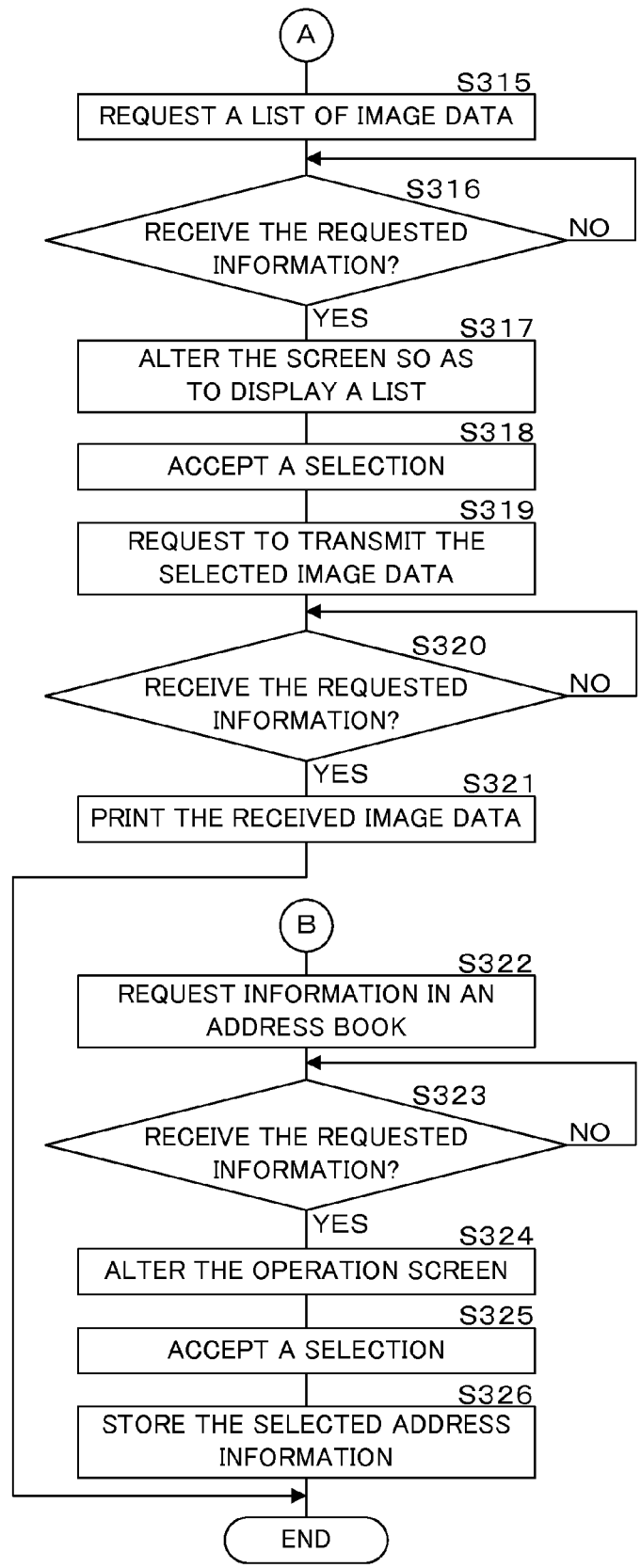
FIG. 9B is a flowchart showing an example of a processing procedure to be executed in an MFP according to Embodiment 3.

FIGS. 9A and 9B are flowcharts showing an example of a processing procedure to be executed in the MFP 1 according to Embodiment 3.

The control unit 10 of the MFP 1 determines whether a connection request from the communication device 2 has been received through the communication unit 14 (Step S301). If the control unit 10 determines that the connection request has not been received (S301: NO), the control unit 10 returns processing to Step S301, and then waits until it is determined that the connection request has been received.

Meanwhile, the control unit 20 of the communication device 2 searches for an access point, that is, the communication unit 14 of the MFP 1, obtains identification information such as SSID of the MFP 1, and transmits a connection request to the MFP 1 based on the obtained identification information. The control unit 20 may be configured to obtain SSID of the MFP 1 directly inputted by a user through the operation unit 21b without performing a search.

At Step S301, if the control unit 10 determines that the connection request has been received (S301: YES), the control unit 10 issues network identification information of the communication device 2 to establish a wireless communication connection with the communication device 2 (Step S302), and transmits the network identification information to the communication device 2 (Step S303). Specifically at Step S302, the control unit 10 assigns an IP address. Therefore, a wireless communication connection is established between the MFP 1 and the communication device 2.

Next, the control unit 10 alters the operation screen displayed in the display unit 11a to an operation screen related to image processing based on the information transmitted/received to/from the communication device 2 (Step S304). The operation screen after alternation to be displayed here is similar to the screen example shown in FIG. 6 according to Embodiment 1.

The control unit 10 accepts an operation through the operation screen after alternation (Step S305). The control unit 10 determines whether a function selected by the operation accepted through the operation unit 11b is any of the "mobile scan," "mobile print," and "address list" (Step S306).

At Step S306, in a case where the control unit 10 determines that the "mobile scan" is selected (S306: mobile scan), the control unit 10 requests the communication device 2 to transmit setting information used when executing image processing by the image reading unit 15 (Step S307). The control unit 10 determines whether the requested setting information has been received from the communication device 2 (Step S308). If the control unit 10 determines that the requested setting information has not been received (S308: NO), the control unit 10 returns processing to Step S308, and then waits until it is determined that the requested setting information has been received. If the control unit 10 determines that the requested setting information has been received (S308: YES), the control unit 10 alters the operation screen displayed in the display unit 11a based on the received setting information (Step S309). The operation screen after alternation in Step S309 is a screen as shown in FIG. 7 according to Embodiment 1, and it is changed so as to reflect the content of the received setting information. Therefore, by a user only touching the touch panel on the icon 114 named "mobile scan" at Step S305, the user can get the display of the scan start button for starting scanning based on the setting information stored in the communication device 2, and the operation can be simplified.

The control unit 10 may also accept an alternation in setting through the operation unit 11b based on the received setting information (Step S310). The control unit 10 executes image reading (scanning) by the image reading unit 15 based on the setting indicated by the received setting information or the setting received at Step S310 (Step S311), and transmits image data generated by the image reading unit 15 to the communication device 2 (Step S312).

The control unit (preparing unit) 10 prepares reference information such as path information inside the storage unit 13 which can be shared with other communication device so as to be able to obtain image data generated by the image reading unit 15 from the other communication devices in addition to transmission of the image data to the communication device 2 (Step S313). The control unit 10 transmits the prepared reference information to the communication device 2 (Step S314), and terminates processing related to a mobile scan function. The reference information in Step S313 may be an e-mail address, a telephone number or the like of such another communication device itself, or it may be path information on a sharable recording device other than the storage unit 13. The image data generated by processing of Step S311 may be transmitted to a server in order to be recorded on the server expressed by a URL (Step S312), the URL may be prepared as reference information and transmitted to the communication device 2. In addition, in a case where the MFP 1 connects to a LAN in an enterprise, a public facility or a house connected through a communication function other than the communication unit 14, and the transmission destination of the generated image data is specified as a communication device, a server or a recording device within the LAN, pass information and URL information for obtaining image data from such transmission destination may be prepared as reference information and may be transmitted to the communication device 2.

At Step S306, if the control unit 10 determines that the "mobile print" is selected (S306: mobile print), the control unit 10 requests the communication device 2 to transmit a list (image identification information, thumbnails or the like) of image data to be printed in order to execute image processing by the image forming unit 16 (Step S315). The control unit 10 determines whether the requested list of image data has been received from the communication device 2 (Step S316). If the control unit 10 determines that the requested list of image data has not been received (S316: NO), the control unit 10 returns processing to Step S316, and then waits until it is determined that the requested list of image has been received. If the control unit 10 determines that the requested list of image data has been received (S316: YES), the control unit 10 alters the screen so as to display a list of image data (thumbnails) in the display unit 11a based on the received list (Step S317).

Figure 10:
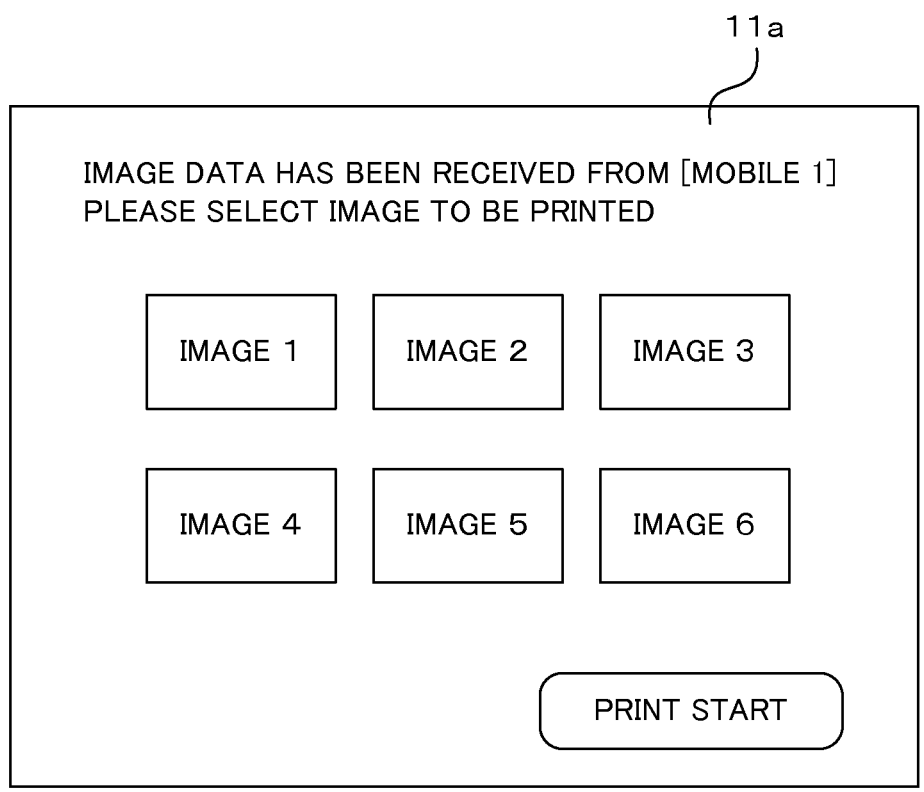
FIG. 10 is an explanatory view showing an example of a screen displaying a list of image data in Embodiment 3.

FIG. 10 is an explanatory view showing an example of a screen displaying the list of image data in Embodiment 3. In the example shown in FIG. 10, the thumbnails of the image data received from "mobile 1" being the identification information of the communication device 2 are listed and displayed. It is possible for a user to select any one of the thumbnails being displayed.

The description continues with reference again to the flowcharts in FIGS. 9A and 9B.

The control unit 10 accepts an operation for selecting image data by a user touching the touch panel on the screen displayed at Step S317 through the operation unit 11b (Step S318), and requests the communication device 2 to transmit the selected image data (not thumbnails) (Step S319). The control unit 10 determines whether the requested image data has been received from the communication device 2 (Step S320). If the control unit 10 determines that the requested image data has not been received (S320: NO), the control unit 10 returns processing to Step S320, and then waits until it is determined that the requested data has been received. If the control unit 10 determines that the requested image data has been received (S320: YES), the control unit 10 executes printing based on the received image data by the image forming unit (printing unit) 16 (Step S321), and terminates processing related to a mobile print function.

Therefore, by only the operation in which a user operates the communication device 2 for connecting to the MFP 1 and touches the touch panel on the icon 115 named "mobile print" in the operation screen after alternation to be displayed in the display unit 11a of the MFP 1, the user can get the operation screen shown in FIG. 10. As a user touches the touch panel on the print start button in a state of selecting a desired image from a list of image data as shown in FIG. 10, a printing of the selected image data can be executed in the MFP 1. In this way, it is possible to simplify the user's operation.

At Step S306, in a case where the control unit 10 determines that whether the "address list" has been selected (S306: Address List), the control unit 10 requests the communication device 2 to transmit address information in order to execute processing for registering the address information (information in an address book) obtained from the communication device 2 into the MFP 1 (Step S322). The control unit 10 determines whether the requested address information has been received from the communication device 2 (Step S323). If the control unit 10 determines that the requested address information has not been received (S323: NO), the control unit 10 returns processing to Step S323, and then waits until it is determined that the requested address information has been received. If the control unit 10 determines that the requested address information has been received (S323: YES), the control unit 10 alters the display screen to an address list display screen including an icon for displaying the received address information. (Step S324).

Figure 11:
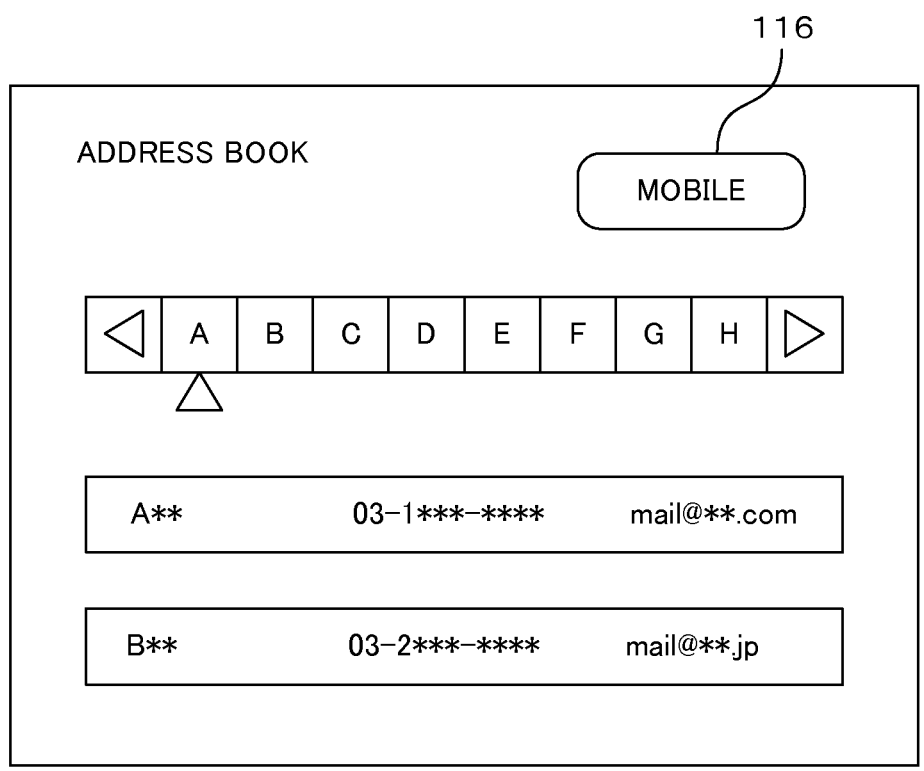
FIG. 11 is an explanatory view showing an example of a screen displaying an address list in Embodiment 3.

FIG. 11 is an explanatory view showing an example of a screen displaying an address list in Embodiment 3. In the example shown in FIG. 11, the address information preliminarily registered in the MFP 1 is displayed in alphabetical order. In the example shown in FIG. 11, the address information includes identification information (name) of the destination, telephone number and e-mail address. Through the processing in Step S324, the icon 116 named "mobile" for displaying the address information received from the communication device 2 is displayed in the display of an address information list.

FIG. 12 is an explanatory view showing an example of a screen displaying a list of address information received from the communication device 2. In the screen example shown in FIG. 11, in a case where a user touches the touch panel on the icon 116, the control unit 10 detects the action through the operation unit 11b and displays the screen example shown in FIG. 12. In the example of FIG. 12, a list of the address information received from "mobile 1" being the identification information of the communication device 2 is displayed. In the example of FIG. 12, the control unit 10 receives e-mail addresses of the destinations "user 1" and "user 2" from the communication device 2 at Step S323. A user is able to select either the address information of the "user 1" in display or that of the "user 2" in display. When a user selects the address information by touching the touch panel on any of address information and touches the touch panel on the register-button displayed in the same screen, the control unit 10 detects that the address information has been selected and then executes registration processing.

The description continues with reference again to the flowcharts in FIGS. 9A and 9B.

The control unit 10 accepts a selection of the address information to be registered among the address information received from the communication device 2 (Step S325). The detail of processing at Step S325 is realized by detecting the selection of address information and the touch on the register-button in the display screen of the list of address information received from the communication device 2 as described above. The control unit 10 adds and stores the selected address information into the address book of the storage unit 13 (Step S326), and terminates processing of registering address information based on the information from the communication device 2.

Therefore, by the operation in which a user operates the communication device 2 for connecting to the MFP 1 and touches the touch panel on the icon 113 named "address list", the user can get the operation screen with the display of the icon 116 named "mobile." After the user touches the touch panel on the icon 116, with the operation of selecting desired address information and then touching the register-button, the address information registered in the communication device 2 can be registered into the MFP 1. Since the MFP 1 automatically obtains address information from the communication device 2 and displays a screen for displaying the obtained address information and accepting a selection of the address information, the user's operation can be simplified.

Embodiment 4

According to Embodiments 1 to 3, the processing for simplifying an operation with proper alternation of an operation screen in a case where the communication device 2 is connected to the MFP 1 is described. According to Embodiment 4, the processing for altering an operation screen in a case where the communication between the communication device 2 and the MFP 1 has been cut off is described below.

A hardware configuration in an image processing system according to Embodiment 4 is similar to the configuration according to Embodiment 1. Accordingly, the configuration units common to those in Embodiment 1 are denoted by the same reference numerals and will not be described in detail.

FIG. 13 is a flowchart showing an example of a processing procedure to be executed in the MFP 1 according to Embodiment 4. After establishing a communication connection between the communication device 2 and the MFP 1 as described in Embodiments 1 to 3, the processing procedure shown in FIG. 13 is periodically executed independently from the processing shown in FIGS. 3, 8, 9A and 9B.

The control unit (cut-off detecting unit) 10 of the MFP 1 determines whether the communication with the communication device 2 has been cut off through the communication unit 14 (Step S41).

At Step S41, if the control unit 10 determines whether the connection has been cut off (S41: YES), the control unit 10 accepts a selection of whether returning the operation screen is executed (Step S42). Specifically at Step S42, the control unit 10 displays, in the display unit 11a, a screen (dialog) for accepting the selection of whether returning the operation screen is executed. FIG. 14 is an explanatory view showing an example of a screen displayed in the MFP 1 in a case where it is determined that the communication with the communication device 2 has been cut off. In the example of FIG. 14, a message indicating the cut-off of connection with the communication device 2 and a message for inquiring whether the information obtained from the communication device 2 is stored in the MFP 1 are displayed. In a case where "YES" is selected here, the selection is made which indicates not returning the operation screen to the initial screen (see FIG.

4). On the contrary, in a case where "NO" is selected, the selection is made which indicates returning the operation screen to the initial screen.

The description continues with reference again to the flowchart in FIG. 13.

At Step S42, the control unit 10 determines whether the selection indicating returning the operation screen has been made (Step S43). If the control unit 10 determines that the selection indicating returning the operation screen has been made (S43: YES), the control unit 10 interrupts processing which has been executed at that point and returns the operation screen to the initial screen (a predetermined operation screen) (Step S44), and then terminates processing. At Step S44, in addition to the processing of returning the operation screen to the initial screen, the control unit 10 may delete the information temporarily stored in the temporary storage unit 12.

If the control unit 10 determines that the selection indicating returning the operation screen has not been made (S43: NO), the control unit 10 terminates processing. In this case, the display of the operation screen after alternation is maintained.

In this way, since the MFP 1 returns the operation screen to the initial screen automatically when the communication connection with the communication device 2 has been cut-off, the user's operation can be simplified. As shown in the above-described processing procedure, since the MFP 1 accepts a selection of whether returning to the initial screen is executed, even when a communication connection has been cut off against the intention of a user, it is also possible to prevent a complicated operation. For example, with regard to this situation, there may be a case that, even when the connection has been cut off, a user wishes to store the address information into the MFP 1. In addition, there may be a case that, even if a communication connection has been cut off, the user wishes to continue the printing based on the image data once transmitted to the MFP 1. In the configuration having need of transmitting/receiving image data again when the connection has been cut off due to failure of communication on the way, the user's operation becomes complicated. In addition, there may be a case that, even if a communication connection has been cut off, a user wishes to continue processing such as transmitting image data generated by a scan to another recording device. Also in this case, even if the connection has been cut off due to failure of communication on the way, if the transmission destination is not the communication device 2, there is no problem in continuing processing. Furthermore, even if the transmission destination is the communication device 2, there may be a case that a user wishes to execute the transmission of image data if the connection with the communication device 2 is established again within a predetermined time period.

In addition, at Step S41, if the control unit 10 determines that the connection with the communication device 2 is effective and has not been cut off (S41: NO), the control unit 10 determines whether a certain period of time (for example, 5 minutes) has elapsed from a recent operation (Step S45). If the control unit 10 determines that the certain period of time has not been elapsed (S45: NO), the control unit 10 returns processing to Step S41. If the control unit 10 determines that the certain period of time has been elapsed (S45: YES), the control unit 10 determines that the operation has been interrupted, and returns the operation screen to the initial screen (S44) and then terminates the processing. Also in this case, the control unit 10 may also delete the information temporarily stored in the temporary storage unit 12.

In this way, in a case where a certain period of time has been elapsed without any operation, since the MFP 1 determines that the operation has been interrupted and then automatically returns to the initial screen, it is possible to prevent the occurrence of situations such as accepting an erroneous operation made by a different user related to the interrupted operation.

Embodiment 5

According to Embodiments 1 to 4, when the communication device 2 is connected to the MFP 1 displaying an initial screen (see FIG. 4) in the display unit 11a, the MFP 1 is configured to alter the initial screen to an operation screen related to processing based on the information transmitted/received to/from the communication device 2. On the other hand, in Embodiment 5, the MFP 1 is configured not to accept an operation even if the MFP 1 displays an initial operation screen in display unit 11a until the communication device 2 is connected to the MFP 1.

A hardware configuration in an image processing system according to Embodiment 5 is similar to the configuration according to Embodiment 1. Accordingly, the configuration units common to those in Embodiment 1 are denoted by the same reference numerals and will not be described in detail.

Figure 15:
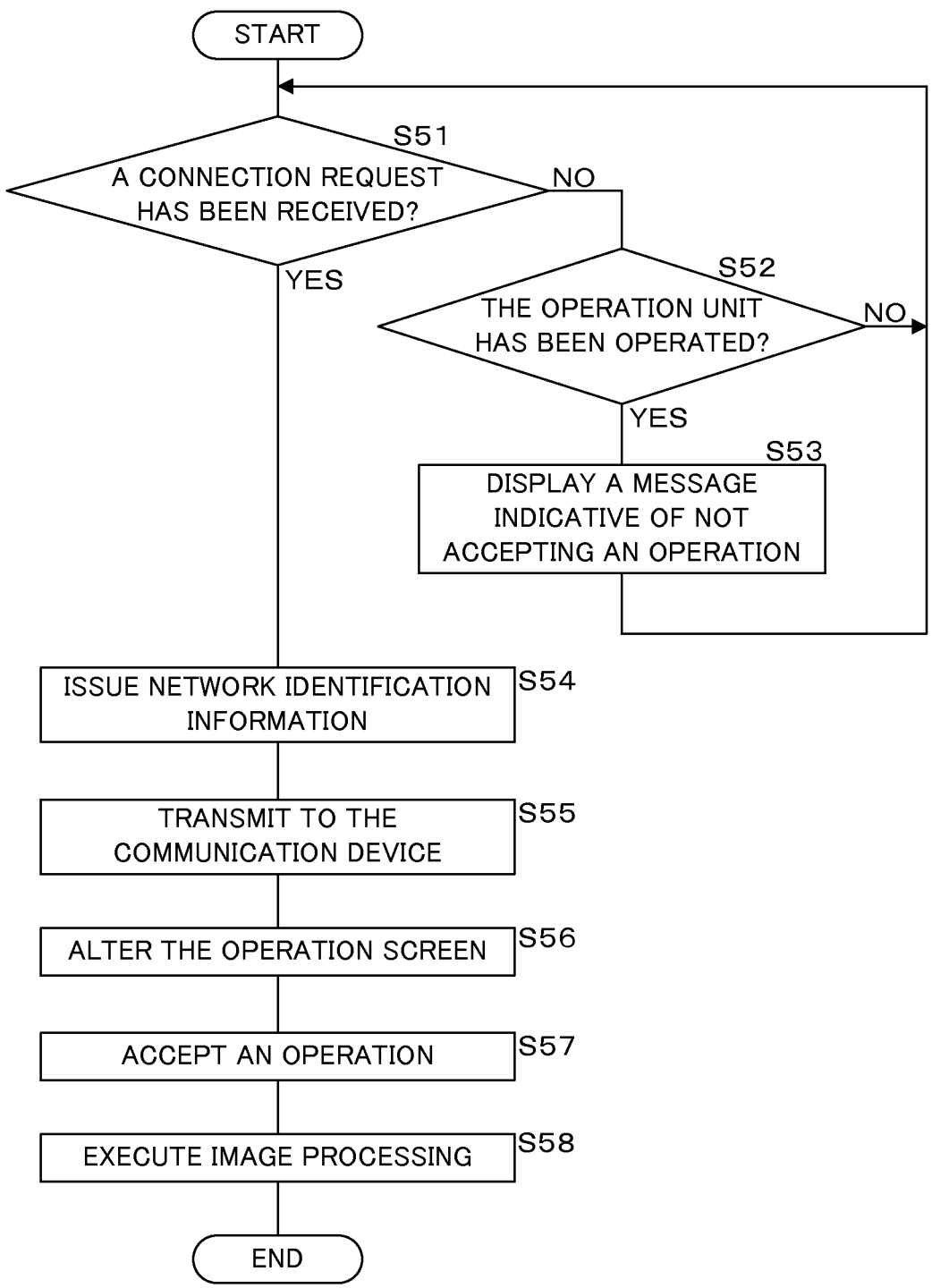
FIG. 15 is a flowchart showing an example of a screen alternation procedure to be executed in an MFP according to Embodiment 5.

FIG. 15 is a flowchart showing an example of a screen alternation procedure to be executed in the MFP 1 according to Embodiment 5.

The control unit 10 of the MFP 1 determines whether a connection request from the communication device 2 has been received through the communication device 14 (Step S51). At this time point, for example, an operation screen is assumed not to be displayed in the display unit 11a. It is noted that an operation screen may be displayed with lower display luminance or the like.

If the control unit 10 determines that the connection request has not been received (S51: NO), the control unit 10 determines whether the operation unit 11b has been operated (Step S52). At Step S52, the control unit 10 determines that the operation unit 11b has been operated in a case where the touch panel of the operation unit 11b is touched or in a case where any of hardware keys is pressed down. If the control unit 10 determines that the operation unit 11b has not been operated (S52: NO), the control unit 10 returns processing to Step S51 and then waits.

At Step S52, if the control unit 10 determines that the operation unit 11b has been operated though not receiving the connection request (S52: YES), the control unit 10 displays a message indicative of not accepting an operation in the display unit 11a (Step S53). The control unit 10 returns processing to Step S51 and then waits. FIG. 16 is an explanatory view showing an example of a message to be displayed in the display unit 11a in Embodiment 5. As shown in FIG. 16, a message indicating that the MFP 1 is not available until the communication device 2 is connected to the MFP 1 is displayed in the display unit 11a. Therefore, until the communication device 2 is connected to the MFP 1, the MFP 1 does not accept an operation and does not execute image processing even if a user touches the operation unit 11b.

The description continues with reference again to the flowchart in FIG. 15.

If the control unit 10 determines that the connection request has been received (S51: YES), the control unit 10 issues network identification information of the communication device 2 in order to establish a wireless communication connection with the communication device 2 (Step S54), and transmits the network identification information to the communication device 2 (Step S55). Therefore, a wireless communication connection is established between the MFP 1 and the communication device 2.

Next, the control unit 10 alters the operation screen displayed in the display unit 11*a* to an operation screen (FIG. 6) related to image processing based on the information transmitted/received to/from the communication device 2 (Step S56), and then waits. Subsequently, in a case where a user touches the operation unit 11*b*, the control unit 10 can accept an operation.

The control unit 10 accepts an operation corresponding to the displayed operation screen (Step S57), executes image processing of scanning by the image reading unit 15 or of printing by the image forming unit 16 (Step S58) in response to the accepted operation, and then terminates processing.

Therefore, only when a user carrying the communication device 2 activates a print scanning application and connect the communication device 2 to the MFP 1, the user can operate the MFP 1. Accordingly, it is possible to prevent complication of an operation related to image processing.

Embodiment 6

According to Embodiment 6, in a case where the MFP 1 is connected to the communication device 2, the MFP 1 alters an operation screen to a screen (custom menu) uniquely corresponding to the communication device 2.

A hardware configuration in an image processing system according to Embodiment 6 is similar to the configuration according to Embodiment 1, except for the information described later which is stored in the storage unit 22 of the communication device 2. Accordingly, the configuration units common to those in Embodiment 1 are denoted by the same reference numerals and will not be described in detail.

In the flash memory of the storage unit 22 of the communication device 2 according to Embodiment 6, UI (User Interface) definition information for defining the configuration of the operation screen for operating the communication device 2 in the MFP 1 is stored in association with the print scanning application. The UI definition information is information described in, for example, an HTML format, an XML format or the like. In this case, the MFP 1 includes a web browser function, and the MFP 1 reads out the UI definition information transmitted from the communication device 2 through the web browser function, and then generates and displays an operation screen for the communication device 2.

The procedure in which the MFP 1 uniquely alters an operation screen in association with the communication device 2 with the use of such UI definition information is described below.

Figure 17:
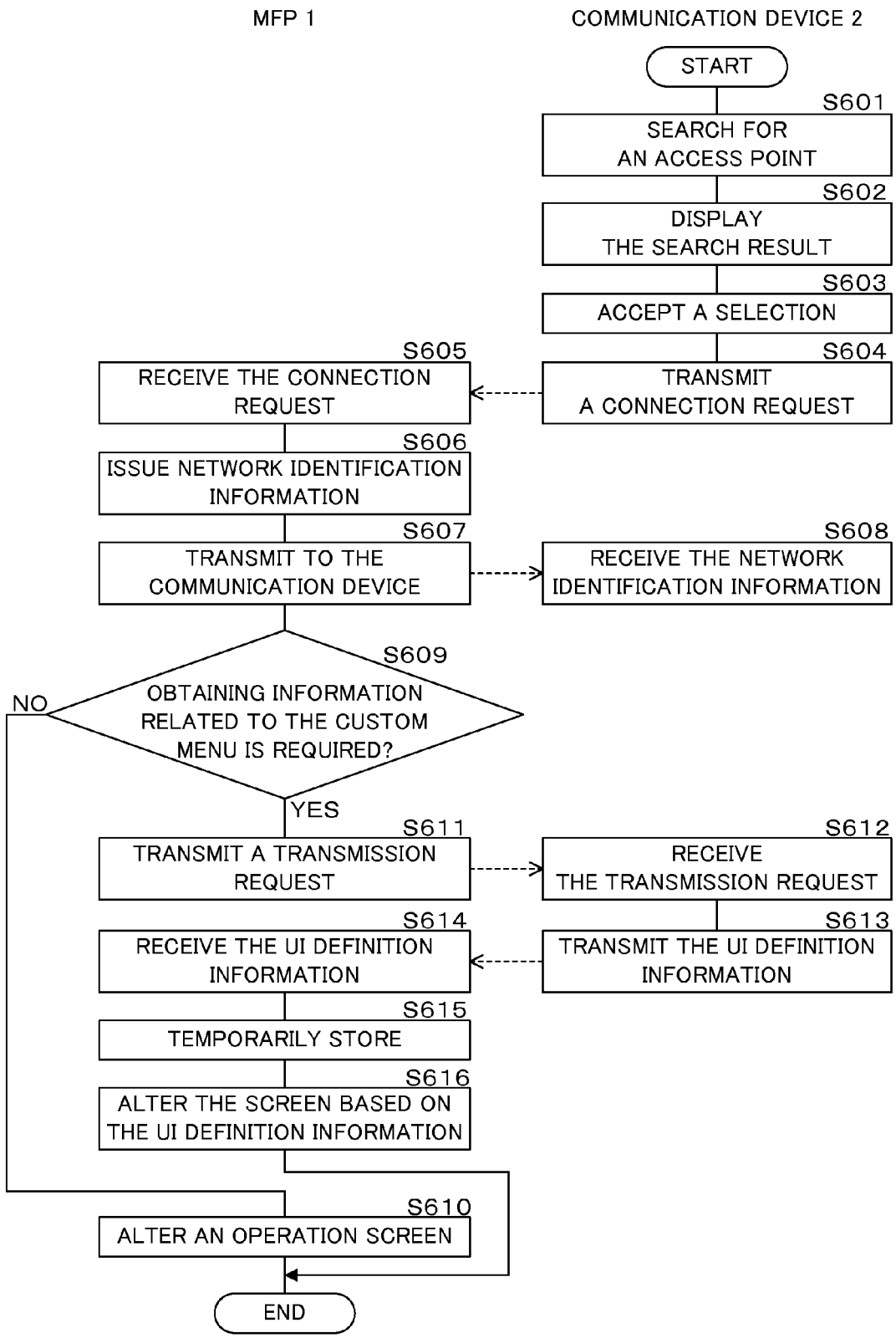
FIG. 17 is a flowchart showing an example of a processing procedure to be executed in an image processing system according to Embodiment 6.

FIG. 17 is a flowchart showing an example of a processing procedure to be executed in the image processing system according to Embodiment 6.

The control unit 20 of the communication device 2 searches for an access point through the communication unit 23 in a case where the print scanning application is activated (Step S601). The control unit 20 displays information of the access point being a search result in the display unit 21*a* (Step S602), and accepts a selection of an access point corresponding to the MFP 1 (Step S603). The control unit 20 transmits a connection request to the access point (communication unit 14) of the MFP 1 (Step S604). At Step S604, in a case where image processing to be executed in the MFP 1 such as scanning or printing is determined, the control unit 20 of the communication device 2 transmits a connection request including an execution request indicating the display of the custom menu corresponding to the content of the image processing.

The control unit 10 of the MFP 1 receives the connection request from the communication device 2 (Step S605), and issues network identification information of the communication device 2 in order to establish a wire communication connection with the communication device 2 (Step S606). The control unit 10 transmits the issued network identification information to the communication device 2 (Step S607).

The control unit 20 of the communication device 2 receives the transmitted network identification information (Step S608). Therefore, a wireless communication connection is established between the MFP 1 and the communication device 2.

The control unit 10 of the MFP 1 determines whether obtaining information related to the custom menu from the communication device 2 is required based on the connection request (Step S609). Specifically, the control unit 10 determines that the information of the custom menu is necessary in a case where an execution request indicating the display of the custom menu is included in the received connection request.

If the control unit 10 determines that obtaining information is not necessary (S609: NO), the control unit 10 alters the screen displayed in the display unit 11*a* to an operation screen, which is set preliminarily, related to image processing based on the information transmitted/received to/from the communication device 2 (Step S610), and then waits. The operation screen is, for example, a screen (see FIG. 6) with increased functions which can be selected in response to the connection of the communication device 2.

At Step S609, if the control unit 10 determines that the obtaining information related to the custom menu is necessary (S609:YES), the control unit 10 transmits a transmission request of the UI definition information to the communication device 2 (Step S611).

In the communication device 2, the control unit 20 receives the transmission request of the UI definition information from the MFP 1 through the communication unit 23 (Step S612), reads out the UI definition information stored in the flash memory of the storage unit 22 and then transmits the UI definition information to the MFP 1 (Step S613).

The control unit 10 of the MFP 1 receives the UI definition information requested at Step S611 (Step S614), and temporarily stores the received UI definition information in the temporary storage unit 12 (Step S615). The control unit 10 generates an operation screen based on the received UI definition information and alters the screen to the generated operation screen (Step S616), and then waits.

Therefore, only by a user connecting the communication device 2 carried by him/herself to the MFP 1, the operation screen of the MFP 1 can be altered to the user interface matched to the utilization purpose of a user who carries the communication device 2. Since the operation screen for a service actually used by a user is directly displayed, the operation can be simplified.

The processing shown in the above-described Embodiments 1 to 6 can also be implemented by combination with other embodiments.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing device comprising:
a display that displays an operation screen for accepting an operation;
a central processor that accepts an operation corresponding to the operation screen;
an image processor that executes image processing corresponding to the operation accepted by the central processor; and
a wireless communicator that executes wireless communication; wherein
the central processor detects a connection with an external device through the wireless communicator; and
the central processor alters the operation screen displayed in the display to an operation screen for accepting an operation related to image processing based on information transmitted/received to/from the external device, when the central processor detects the connection.

2. The image processing device according to claim 1, wherein
the image processor includes an image generator that generates image data, and
the central processor alters the screen being displayed in the display to an operation screen including an interface for accepting an instruction to generate image data by the image generator.

3. The image processing device according to claim 2, wherein the central processor prepares, based on the information received from the external device in connection, reference information for supplying image data generated by the image generator to the external device.

4. The image processing device according to claim 1, wherein
the image processor includes a printer that prints image data, and
the central processor alters the screen being displayed in the display to an operation screen including an interface for accepting an instruction to print image data by the printer.

5. The image processing device according to claim 1, further comprising a storage that stores information received from the external device, wherein
the central processor alters the screen being displayed in the display to an operation screen including an interface for accepting a selection of information to be stored in the storage.

6. The image processing device according to claim 1, wherein:
the central processor detects that a connection with the external device through the wireless communicator has been cut off; and
the central processor alters the operation screen altered by the central processor to a predetermined operation screen, when the central processor detects the cut-off.

7. The image processing device according to claim 1, wherein
the wireless communicator directly communicates with the external device.

8. The image processing device according to claim 1, wherein
the central processor accepts an operation corresponding to the operation screen after the central processor detects the connection.

9. The image processing device according to claim 1, further comprising a screen generator that generates an operation screen based on information received from the external device in connection, wherein
the central processor alters the screen being displayed in the display to the operation screen generated by the screen generator.

10. An image processing system comprising: an image processing device; and a communication device capable of connecting to the image processing device through wireless communication, wherein
the image processing device includes:
a display that displays an operation screen for accepting an operation;
a central processor that accepts an operation corresponding to the operation screen;
an image processor that executes image processing corresponding to the operation accepted by the central processor; and
a wireless communicator that executes wireless communication; wherein
the central processor detects a connection with the communication device through the wireless communicator; wherein
the central processor alters the operation screen displayed in the display to an operation screen for accepting an operation related to image processing based on information transmitted/received to/from the communication device, when the central processor unit detects the connection.

* * * * *